(12) United States Patent
Shiotani et al.

(10) Patent No.: US 10,645,755 B2
(45) Date of Patent: May 5, 2020

(54) COMMUNICATION SYSTEM, COMMUNICATION DEVICE, AND COMMUNICATION CONTROL METHOD

(71) Applicant: RICOH COMPANY, LTD., Tokyo (JP)

(72) Inventors: Yoshimitsu Shiotani, Kanagawa (JP); Kengo Matsuyama, Tokyo (JP); Shintaro Kawamura, Kanagawa (JP); Wang Yang, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/018,493

(22) Filed: Jun. 26, 2018

(65) Prior Publication Data

US 2019/0007997 A1    Jan. 3, 2019

(30) Foreign Application Priority Data

Jul. 3, 2017    (JP) .................................. 2017-130705

(51) Int. Cl.
*H04W 92/20* (2009.01)
*H04W 60/00* (2009.01)
(Continued)

(52) U.S. Cl.
CPC .......... *H04W 92/20* (2013.01); *H04B 7/0617* (2013.01); *H04B 7/15507* (2013.01);
(Continued)

(58) Field of Classification Search
CPC . H04B 7/0617; H04B 7/15507; H04W 40/24; H04W 52/0245; H04W 52/146;
(Continued)

(56) References Cited

U.S. PATENT DOCUMENTS 6,122,267 A * 9/2000 Abiven ................. H04L 12/403
370/338
6,810,428 B1 * 10/2004 Larsen ................. H04B 7/2606
709/238
(Continued)

FOREIGN PATENT DOCUMENTS

CN       1574699 B   *  9/2010   ............. H04W 16/28
CN     104303491 A   *  1/2015   ........... H04M 1/7253
(Continued)

OTHER PUBLICATIONS

Extended European Search Report dated Nov, 12. 2016 in Patent Application No. 18176309.5, 14 pages.

*Primary Examiner* — Eric Nowlin
(74) *Attorney, Agent, or Firm* — Xsensus LLP

(57) ABSTRACT

A communication system includes multiple first communication devices and second and third communication devices. Each first communication device performs first wireless communication using a directive radio wave using first and second function modules; performs second wireless communication wider in communication range than the first wireless communication using a third function module; and generates different network cells. The second communication device performs the first wireless communication with the first function module and connects to one of the network cells. The third communication device manages a multi-hop communication path using the second wireless communication. Each first communication device collects, in the first wireless communication, peripheral communication device information; transmits the information to the third communication device in the second wireless communication; and transfers, in the first wireless communication, data received in the first wireless communication to another communica- (Continued)

tion device, through the communication path instructed by the third communication device.

11 Claims, 25 Drawing Sheets

(51) Int. Cl.
| | |
|---|---|
| *H04B 7/06* | (2006.01) |
| *H04W 72/04* | (2009.01) |
| *H04W 88/04* | (2009.01) |
| *H04B 7/155* | (2006.01) |
| *H04W 88/08* | (2009.01) |
| *H04W 40/24* | (2009.01) |
| *H04W 84/18* | (2009.01) |

(52) U.S. Cl.
CPC ....... *H04W 60/00* (2013.01); *H04W 72/0406* (2013.01); *H04W 88/04* (2013.01); *H04W 40/24* (2013.01); *H04W 84/18* (2013.01); *H04W 88/08* (2013.01)

(58) Field of Classification Search
CPC ... H04W 52/241; H04W 60/00; H04W 64/00; H04W 72/0406; H04W 84/12; H04W 88/04; H04W 88/08
See application file for complete search history.

(56) References Cited

U.S. PATENT DOCUMENTS

| | | | | |
|---|---|---|---|---|
| 7,031,293 B1* | 4/2006 | Srikrishna | | H04K 3/226 370/348 |
| 7,295,806 B2* | 11/2007 | Corbett | | H04W 16/28 370/274 |
| 7,321,787 B2* | 1/2008 | Kim | | H04L 12/12 455/574 |
| 7,664,054 B2* | 2/2010 | Adya | | H04W 8/005 370/255 |
| 7,668,137 B2* | 2/2010 | Srikrishna | | H04K 3/226 370/329 |
| 7,903,631 B2* | 3/2011 | Ross | | H04L 45/46 370/310.2 |
| 8,023,961 B2* | 9/2011 | Yanagihara | | H04W 64/00 455/404.2 |
| 8,130,737 B2* | 3/2012 | Singh | | H04W 84/18 370/338 |
| 8,285,301 B2* | 10/2012 | Hirose | | G01S 19/48 340/10.1 |
| 8,432,854 B2* | 4/2013 | Cordeiro | | H04W 48/08 370/328 |
| 8,514,758 B2* | 8/2013 | De Kimpe | | H04W 52/0216 370/311 |
| 8,964,625 B2* | 2/2015 | Cemper | | H04W 40/20 370/248 |
| 9,226,262 B2* | 12/2015 | Chen | | G01S 5/00 |
| 9,226,334 B2* | 12/2015 | Matsuda | | H04W 76/10 |
| 9,385,802 B2* | 7/2016 | Yoo | | H04W 24/02 |
| 9,392,599 B2* | 7/2016 | Maeda | | H04W 72/04 |
| 9,648,547 B1* | 5/2017 | Hart | | H04W 48/10 |
| 9,674,687 B2* | 6/2017 | Huang | | H04W 8/005 |
| 9,699,831 B2* | 7/2017 | Choi | | H04W 88/08 |
| 9,712,394 B2* | 7/2017 | Abe | | H04W 40/02 |
| 9,794,932 B2* | 10/2017 | Choi | | H04L 1/1614 |
| 9,854,556 B2* | 12/2017 | Skaaksrud | | H04W 12/06 |
| 10,050,838 B1* | 8/2018 | Hart | | H04W 4/08 |
| 10,084,515 B2* | 9/2018 | Ferrante | | H04W 72/0406 |
| 10,091,720 B2* | 10/2018 | Sakoda | | H04W 8/005 |
| 10,159,105 B1* | 12/2018 | Linsky | | H04L 69/24 |
| 2004/0038707 A1* | 2/2004 | Kim | | H04L 12/12 455/554.1 |
| 2004/0242275 A1* | 12/2004 | Corbett | | H04W 16/28 455/562.1 |
| 2005/0163144 A1* | 7/2005 | Srikrishna | | H04K 3/226 370/431 |
| 2006/0215605 A1* | 9/2006 | Srikrishna | | H04K 3/226 370/329 |
| 2006/0215624 A1* | 9/2006 | Adya | | H04W 8/005 370/338 |
| 2007/0191022 A1* | 8/2007 | Yanagihara | | H04W 64/00 455/456.1 |
| 2008/0189394 A1* | 8/2008 | Ross | | H04L 45/46 709/219 |
| 2009/0147714 A1* | 6/2009 | Jain | | H04W 52/0216 370/311 |
| 2009/0201939 A1 | 8/2009 | Yamamoto | | |
| 2009/0232049 A1* | 9/2009 | Singh | | H04W 84/18 370/328 |
| 2010/0014502 A1* | 1/2010 | Singh | | H04B 7/12 370/343 |
| 2010/0015996 A1* | 1/2010 | Hirose | | G01S 19/06 455/456.1 |
| 2010/0067428 A1* | 3/2010 | Cordeiro | | H04W 48/08 370/315 |
| 2010/0097969 A1* | 4/2010 | De Kimpe | | H04W 52/0216 370/311 |
| 2010/0142435 A1 | 6/2010 | Kim et al. | | |
| 2011/0143805 A1* | 6/2011 | Ramasamy | | H04W 52/146 455/522 |
| 2011/0158210 A1* | 6/2011 | Cemper | | H04W 40/20 370/338 |
| 2013/0155900 A1 | 6/2013 | Sampath et al. | | |
| 2013/0170382 A1* | 7/2013 | Kang | | H04W 64/00 370/252 |
| 2013/0265935 A1* | 10/2013 | Matsuda | | H04W 76/10 370/315 |
| 2013/0311694 A1* | 11/2013 | Bhamidipati | | H04M 1/7253 710/303 |
| 2015/0094088 A1* | 4/2015 | Chen | | G01S 5/00 455/456.1 |
| 2015/0154545 A1* | 6/2015 | Skaaksrud | | H04W 12/06 705/333 |
| 2015/0230244 A1* | 8/2015 | Choi | | H04L 1/1614 370/329 |
| 2015/0271658 A1* | 9/2015 | Huang | | H04W 8/005 455/39 |
| 2015/0282157 A1* | 10/2015 | Kim | | H04W 48/14 370/329 |
| 2016/0007351 A1 | 1/2016 | Shiotani | | |
| 2016/0119051 A1* | 4/2016 | Yoo | | H04W 24/02 455/15 |
| 2016/0241314 A1* | 8/2016 | Ferrante | | H04W 72/0406 |
| 2016/0248662 A1 | 8/2016 | Shiotani | | |
| 2017/0064583 A1* | 3/2017 | Roy | | H04W 36/0005 |
| 2017/0156066 A1 | 6/2017 | Shiotani | | |
| 2017/0187439 A1 | 6/2017 | Park et al. | | |
| 2017/0273033 A1* | 9/2017 | Lee | | H04W 52/283 |
| 2017/0339732 A1 | 11/2017 | Matsuyama et al. | | |
| 2019/0028156 A1* | 1/2019 | Ferrante | | H04B 7/0408 |
| 2019/0090162 A1* | 3/2019 | Roy | | H04W 36/0005 |

FOREIGN PATENT DOCUMENTS

| | | | | |
|---|---|---|---|---|
| EP | 0767561 A1 * | 4/1997 | ........... | H04L 12/403 |
| EP | 1482657 A2 * | 12/2004 | ........... | H04W 16/28 |
| EP | 1708437 A1 * | 10/2006 | ........... | H04W 8/005 |
| EP | 1482657 B1 * | 4/2014 | ........... | H04W 16/28 |
| EP | 2853082 A1 * | 4/2015 | ........ | H04M 1/7253 |
| JP | 2001-313672 | 11/2001 | | |
| JP | 2009-213122 | 9/2009 | | |
| JP | 2016-015572 | 1/2016 | | |
| JP | 2016-154299 | 8/2016 | | |
| JP | 2016-167878 | 9/2016 | | |
| JP | 2016-225744 | 12/2016 | | |
| JP | 2016-225922 | 12/2016 | | |
| JP | 2017-103586 | 6/2017 | | |
| JP | 2017-111766 | 6/2017 | | |
| JP | 2017-146796 | 8/2017 | | |
| JP | 2017-208649 | 11/2017 | | |
| JP | 2017-212714 | 11/2017 | | |

(56) References Cited

FOREIGN PATENT DOCUMENTS

| JP | 2018-056669 | 4/2018 | |
|---|---|---|---|
| WO | WO-02078369 A1 * | 10/2002 | ............ H04W 72/04 |
| WO | WO2010/010708 A1 | 1/2010 | |
| WO | WO-2013177001 A1 * | 11/2013 | .......... H04M 1/7253 |
| WO | WO2014/180378 A1 | 11/2014 | |

* cited by examiner

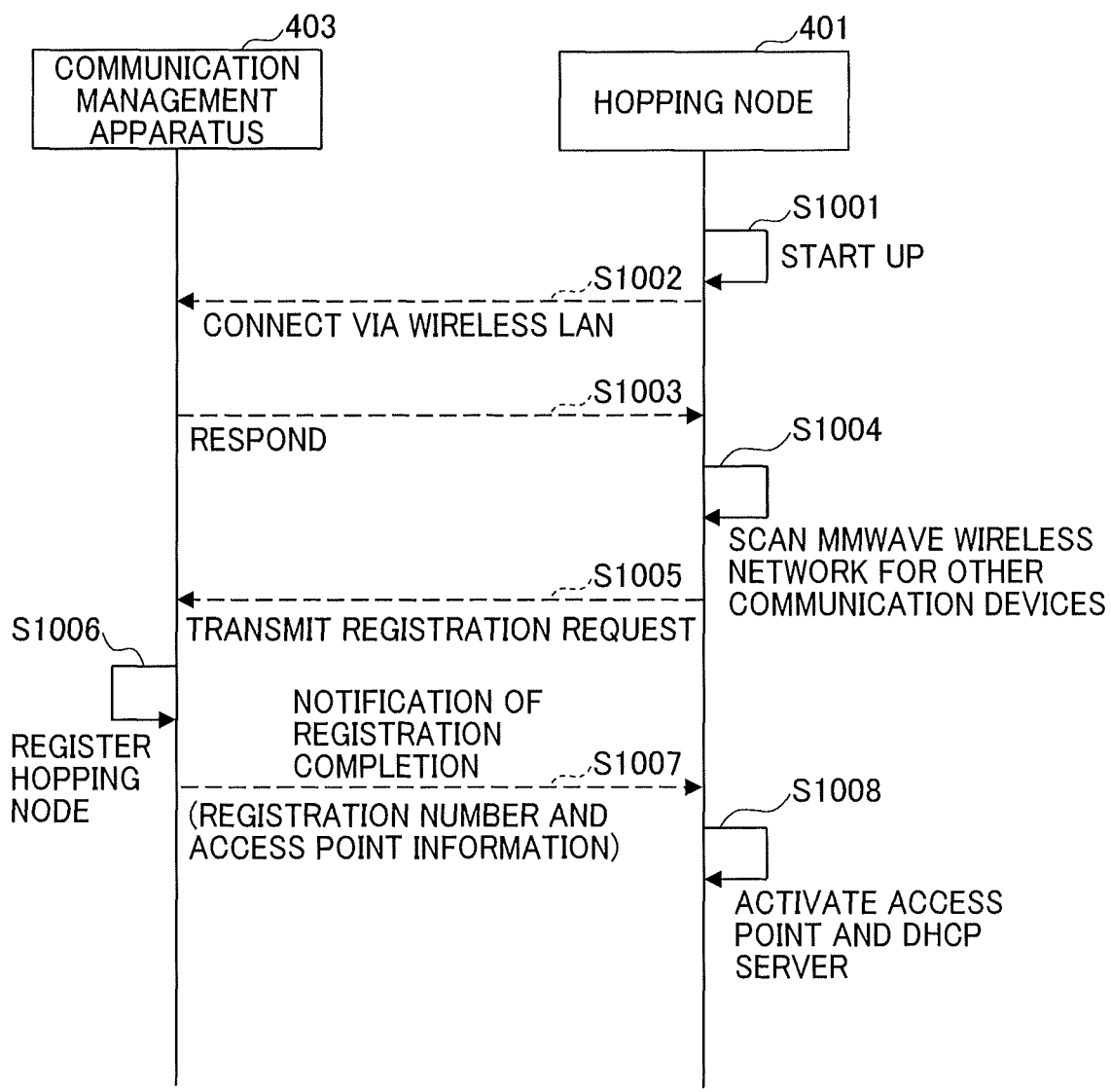

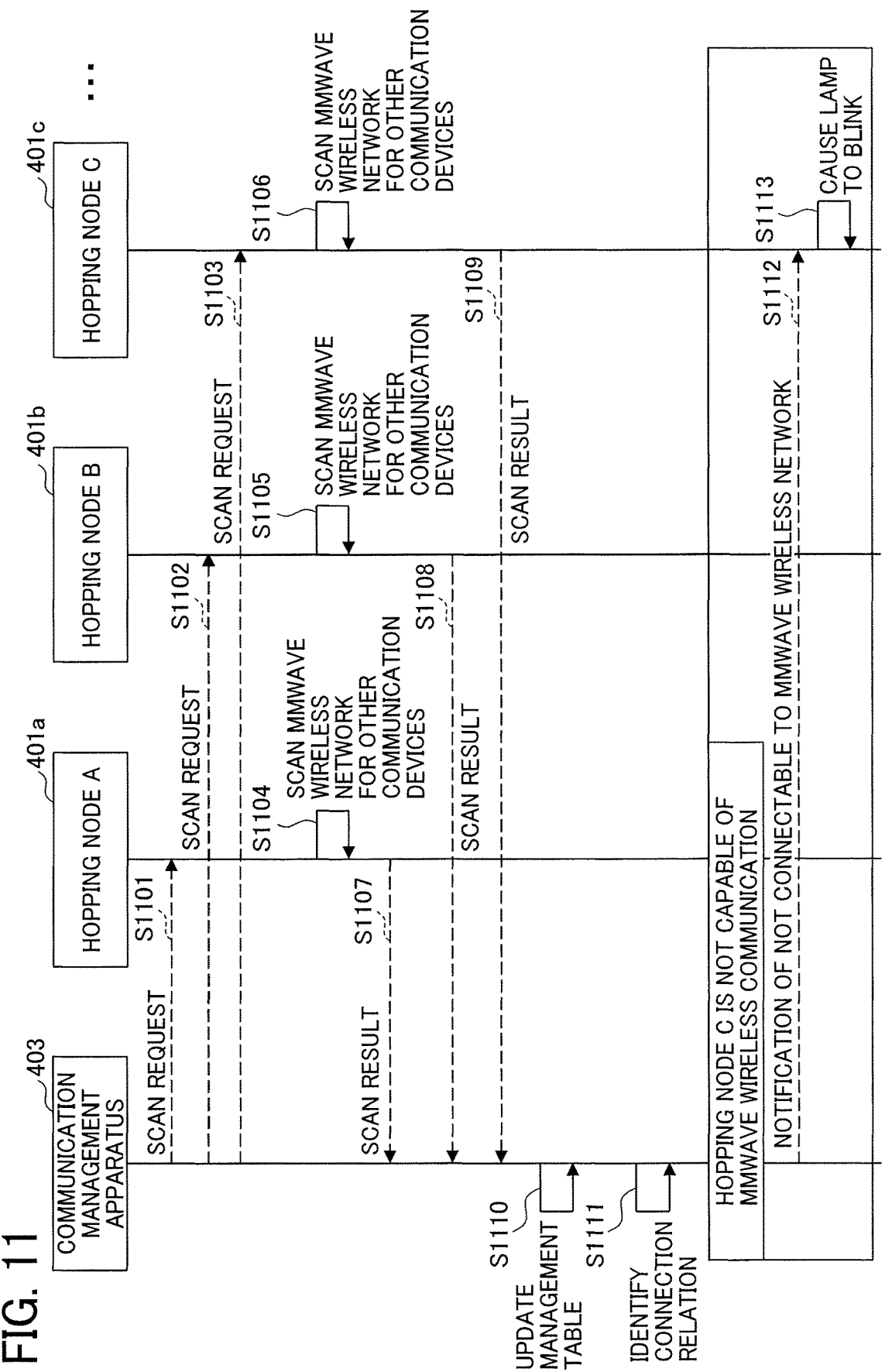

FIG. 12A

Table 1210:

| HOPPING NODE IDENTIFIER | IDENTIFIER OF RETRIEVED HOPPING NODE | RADIO WAVE INTENSITY |
|---|---|---|
| A | B | 60 |
| A | C | 20 |
| B | A | 20 |
| B | C | 40 |
| C | A | 80 |
| C | B | 100 |

FIG. 12B

Table 1220:

| HOPPING NODE IDENTIFIER | IDENTIFIER OF RETRIEVED HOPPING NODE | RADIO WAVE INTENSITY | DISTANCE |
|---|---|---|---|
| A | B | 60 | 8.1m |
| A | C | 20 | 10m |
| B | A | 20 | 8.1m |
| B | C | 40 | 5m |
| C | A | 80 | 10m |
| C | B | 80 | 5m |

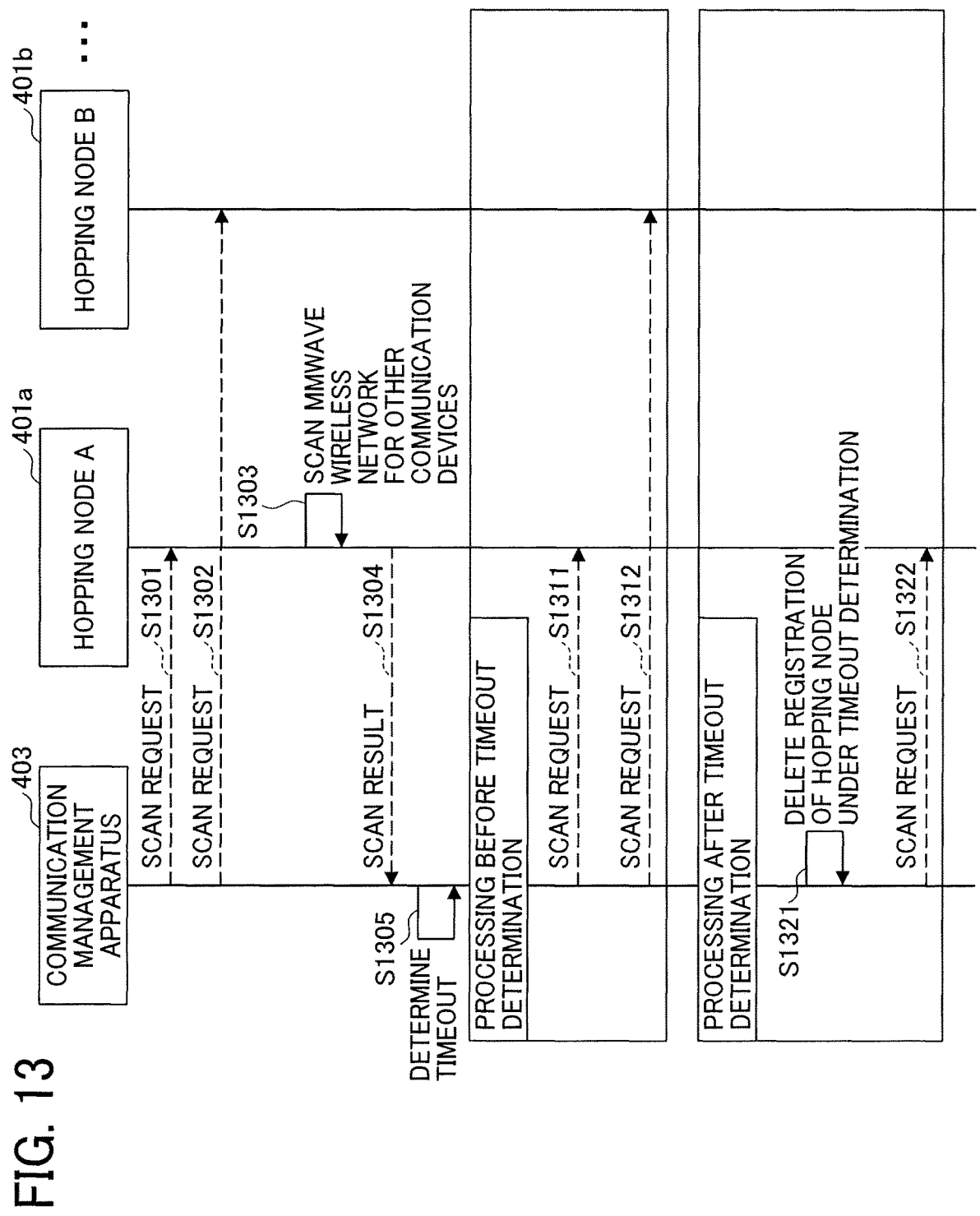

| MEASUREMENT TIME | SIGNAL STRENGTH | THROUGHPUT | ERROR RATE |
|---|---|---|---|
| 100msec | 80 | 1000Mbps | 0% |
| 200msec | 80 | 850Mbps | 0% |
| 300msec | 80 | 700Mbps | 0% |
| 400msec | 60 | 200Mbps | 3% |
| 500msec | 60 | 300Mbps | 15% |
| ... | ... | ... | ... |

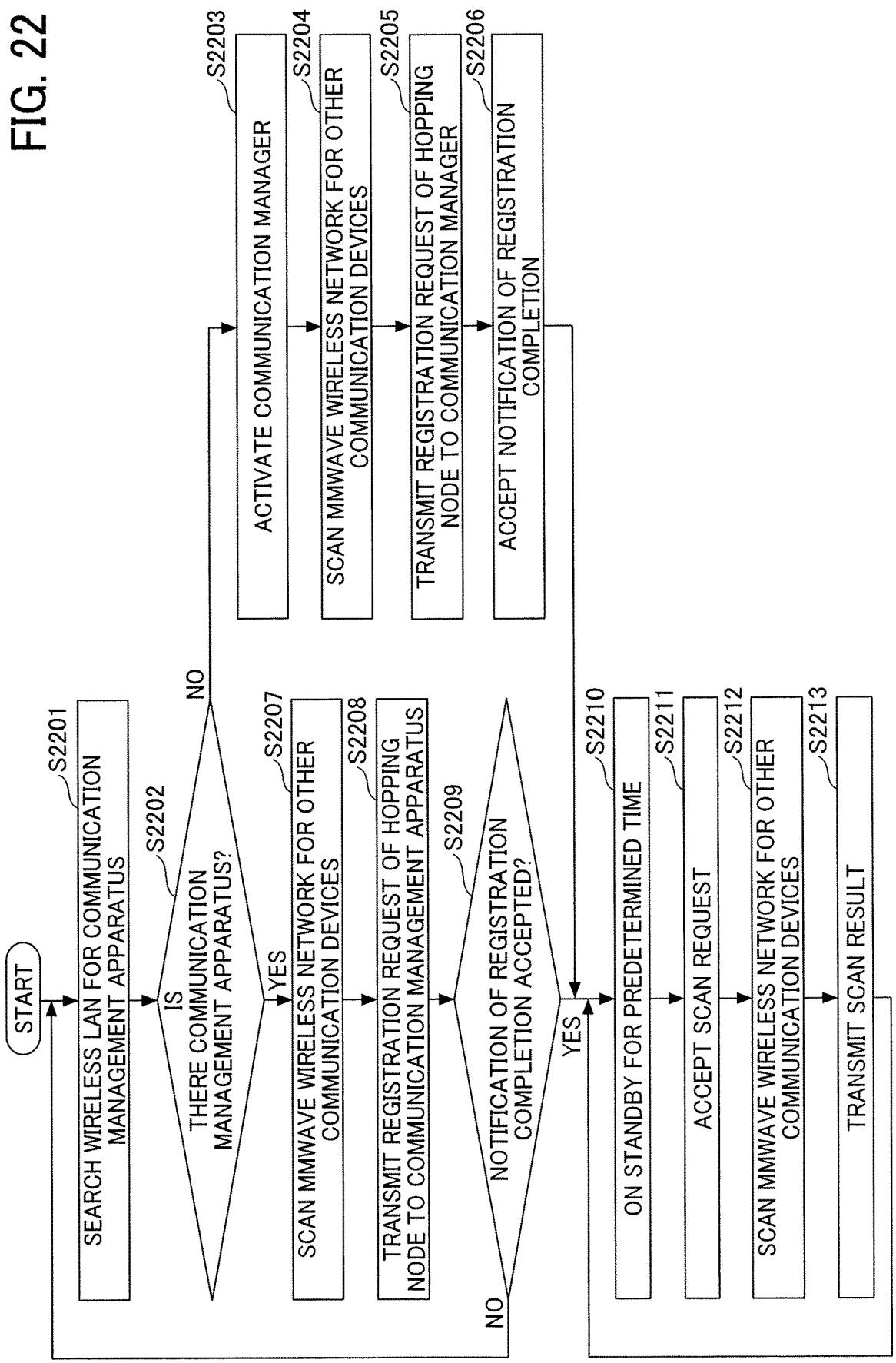

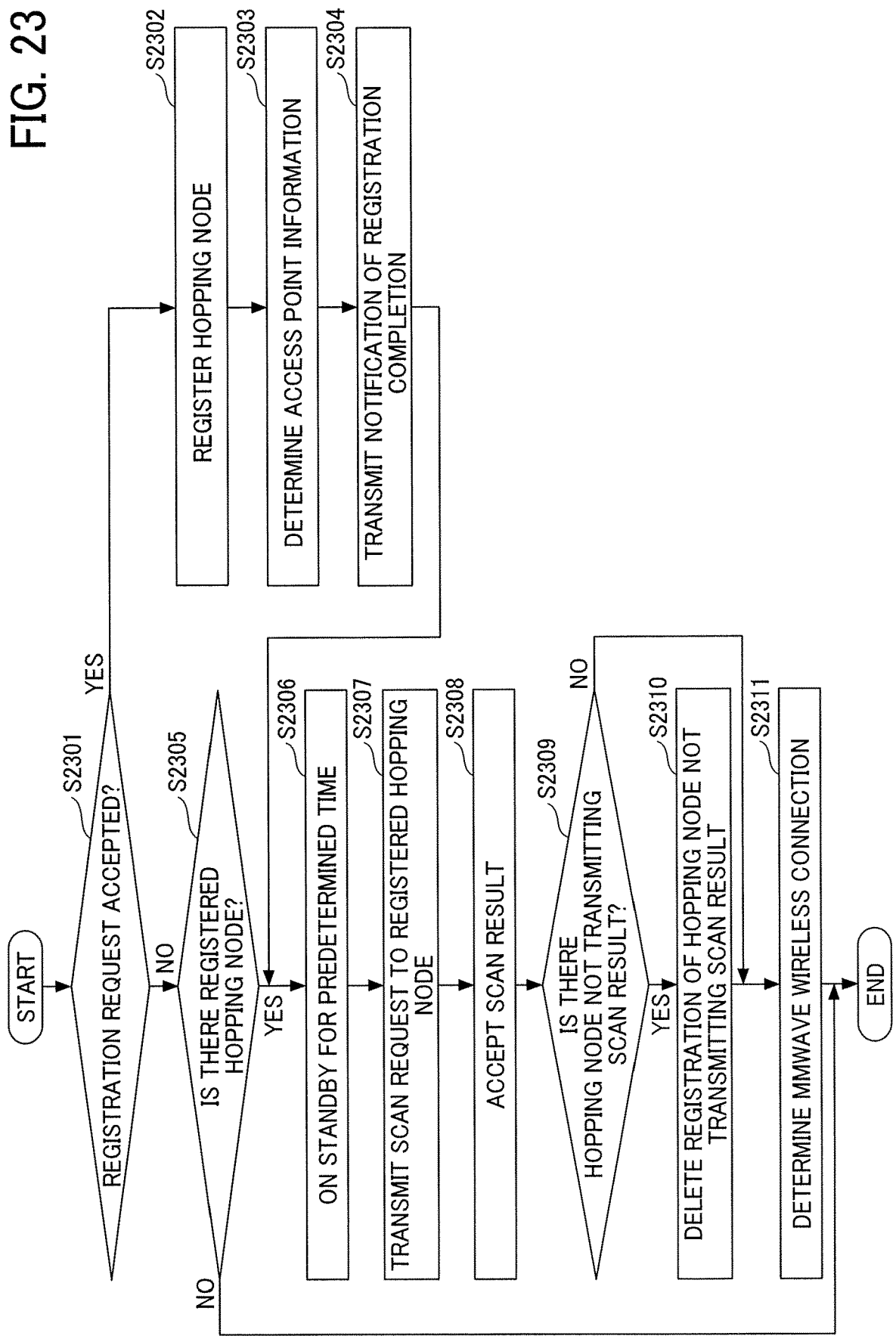

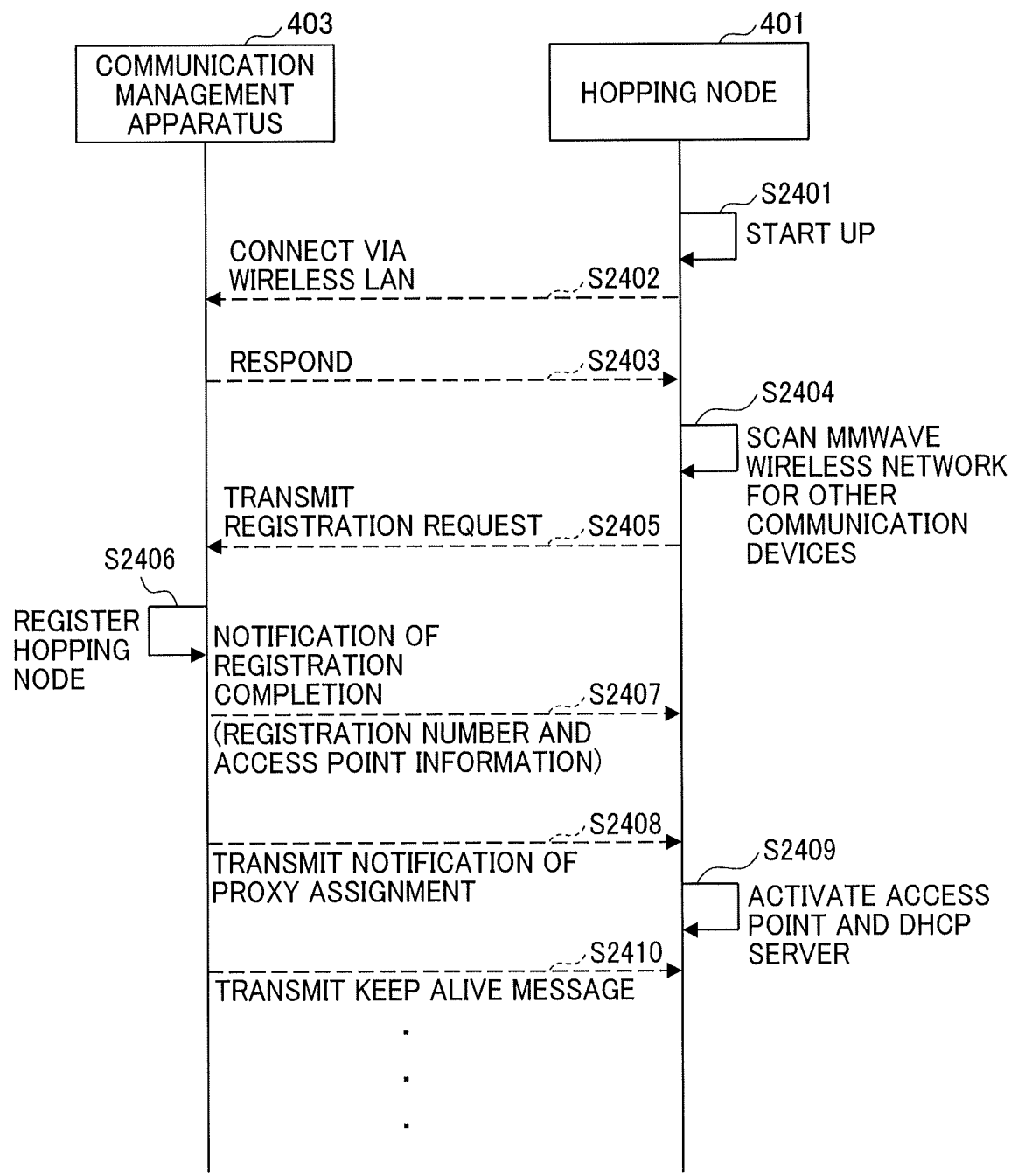

COMMUNICATION SYSTEM, COMMUNICATION DEVICE, AND COMMUNICATION CONTROL METHOD

CROSS-REFERENCE TO RELATED APPLICATIONS

This patent application is based on and claims priority pursuant to 35 U.S.C. § 119(a) to Japanese Patent Application No. 2017-130705, filed on Jul. 3, 2017, in the Japan Patent Office, the entire disclosure of which is hereby incorporated by reference herein.

BACKGROUND

Technical Field

This disclosure relates to a communication system, a communication device, and a communication control method.

Description of the Related Art

This disclosure relates to a communication system, a communication device, a communication control method, and a recording medium.

Background Art

Institute of Electrical and Electronics Engineers (IEEE) 802.11ad provides communication standards for high-speed data transmission by millimeter wave wireless communication using a millimeter wave (mmWave) frequency band (e.g., 60 GHz) in which the radio wave has strong straightness and a relatively narrow communication range.

There are wireless communication systems that use such millimeter wave frequencies for transmitting data in multi-hop communication via a relay device from a sender communication device to a recipient communication device.

SUMMARY

An embodiment of this disclosure provides a communication system for performing multi-hop data communication using a plurality of communication devices. The communication system includes a plurality of first communication devices each of which includes circuitry configured o perform first wireless communication using a directive radio wave, using a first function module and a second function module; perform second wireless communication wider in communication range than the first wireless communication, using a third function module; and form network cells different from each other, using the first function module of each of the plurality of first communication devices.

The communication device further includes a second communication device including circuitry configured to perform the first wireless communication with the first function module; and connect to one of the network cells; and a third communication device including circuitry configured to perform the second wireless communication; and manage a multi-hop communication path using the second wireless communication. The circuitry of each of the plurality of first communication devices is further configured to collect, in the first wireless communication, information of peripheral communication devices of the plurality of communication devices; transmit the information of peripheral communication devices to the third communication device in the second wireless communication; and transfer, in the first wireless communication, data received in the first wireless communication to another one of the plurality of communication devices, according to an instruction on the multi-hop communication path transmitted in the second wireless communication from the third communication device.

Another embodiment provides a communication device used in a communication system to perform multi-hop data communication using a plurality of communication devices. The communication device includes circuitry configured to perform first wireless communication using a directive radio wave, using a first function module and a second function module; perform second wireless communication wider in communication range than the first wireless communication, using a third function module; form a network cell using the first function module; collect, in the first wireless communication, information of peripheral communication devices; transmit the information of peripheral communication devices to a communication management apparatus in the second wireless communication, the communication management apparatus configured to manage a multi-hop communication path using the second wireless communication; and transfer, in the first wireless communication, data received in the first wireless communication to another one of the plurality of communication devices, according to an instruction on a multi-hop communication path transmitted in the second wireless communication from the communication management apparatus.

Another embodiment provides a communication management method performed by a communication system for performing multi-hop data communication, using a plurality of communication devices. The method includes performing, with each one of a plurality of first communication devices, first wireless communication using a directive radio wave; performing second wireless communication wider in communication range than the first wireless communication; generating network cells different from each other; collecting, in the first wireless communication, information of peripheral communication devices; transmitting the information of peripheral communication devices to a communication management apparatus in the second wireless communication, the communication management apparatus configured to manage a multi-hop communication path using the second wireless communication; and transferring, in the first wireless communication, data received in the first wireless communication to another one of the plurality of communication devices, according to an instruction on a multi-hop communication path transmitted in the second wireless communication from the communication management apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 is a sequence chart illustrating an example of registration of the hopping node according to Embodiment 1;

FIG. 11 is a sequence chart illustrating an example of identification of connection relation according to Embodiment 1;

FIGS. 12A and 12B illustrate a management table according to Embodiment 1;

FIG. 13 is a sequence chart illustrating example of deletion of hopping node, according to Embodiment 1.

FIG. 22 is a flowchart illustrating example processing performed by the hopping node according to Embodiment 2;

FIG. 23 is a flowchart of example processing performed by a communication management apparatus according to an embodiment; and FIG. 24 is a sequence chart illustrating an example of proxy assignment according to Embodiment 2.

Figure 1A:
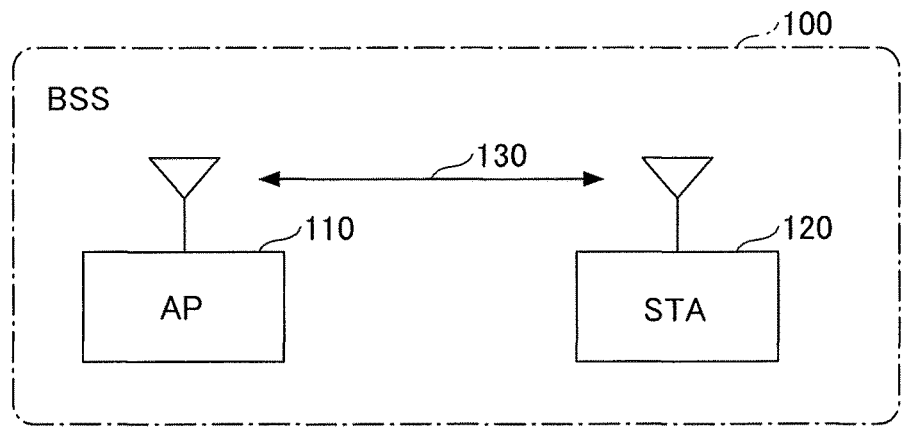
FIGS. 1A and 1B are schematic diagrams of a millimeter wave wireless communication system according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an embodiment of this disclosure is described. As used herein, the singular forms "a", "an", and "the" are intended to include the plural forms as well, unless the context clearly indicates otherwise.

General Configuration of Millimeter Wave Wireless Communication System

Before describing embodiments of this disclosure, descriptions are given of a millimeter wave (mmWave) wireless communication system relating to the embodiments of this disclosure.

A mmWave wireless communication system is a wireless communication system to use a millimeter wave frequency band (e.g., 60 GHz), in which radio wave straightness is strong and communication range is relatively narrow, for high-speed data transfer. The description below is on the assumption that the mmWave wireless communication system is conformable to IEEE 802.11ad. Note that IEEE 802.11ad is an example standard adopted in the mmWave wireless communication system according to embodiments of this disclosure.

Network Configuration

The mmWave wireless communication system conformable to IEEE 802.11ad performs communication using a millimeter wave frequency band (e.g., 60 GHz) in which radio wave straightness is strong and communication range is relatively narrow and allows a wide bandwidth of 2.16 GHz for each channel.

Additionally, since radio wave propagation loss increases in a millimeter wave band, mmWave wireless communication systems generally use beamforming to increase an antenna gain. Beamforming is a technique to narrow the beam direction of radio wave in transmission and reception of radio wave. Accordingly, a communication unit of the mmWave wireless communication system generally has difficulty in simultaneously communicating with a plurality of communication devices.

Therefore, mmWave wireless communication systems use, as wireless multiplexing, a communication protocol of time division multiple access (TDMA), instead of carrier sense multiple access/collision avoidance (CSMA/CA) used in a conventional wireless local area network (LAN).

In mmWave wireless communication systems, a coordinator device called access point (AP) configures a network cell called basic service set (BSS) and manages time slots in TDMA protocol.

FIGS. 1A, 1B, 2A, and 2B are diagrams for explaining the mmWave wireless communication system according to the present embodiment. FIG. 1A illustrates an example of one-on-one network in which an AP 110 and a station 120 (also "STA 120") form a BSS 100 and perform mmWave wireless communication 130 therebetween. The BSS 100 is a network cell of the mmWave wireless communication system. In the example illustrated in FIG. 1A, the AP 110 manages time slots in the TDMA protocol and transmits a beacon frame, for example, at regular time intervals.

Figure 1B:
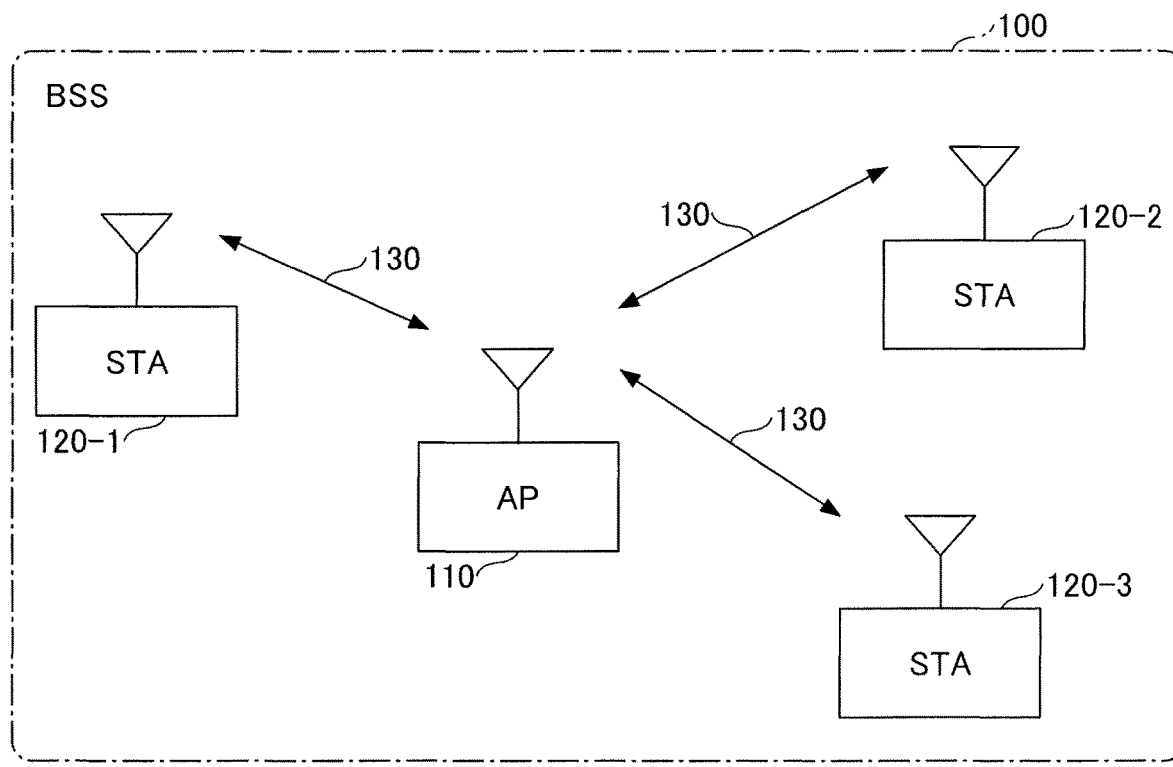

FIG. 1B illustrates an example of star topology network in which the AP 110 forms the BSS 100 together with a plurality of STAs 120-1, 120-2, and 120-3 (collectively "STAs 120") and communicates therewith in the mmWave wireless communication 130. In the example illustrated in FIG. 1B, similarly, the AP 110 manages time slots in the TDMA protocol and transmits a beacon frame, for example, at regular time intervals.

Figure 2A:
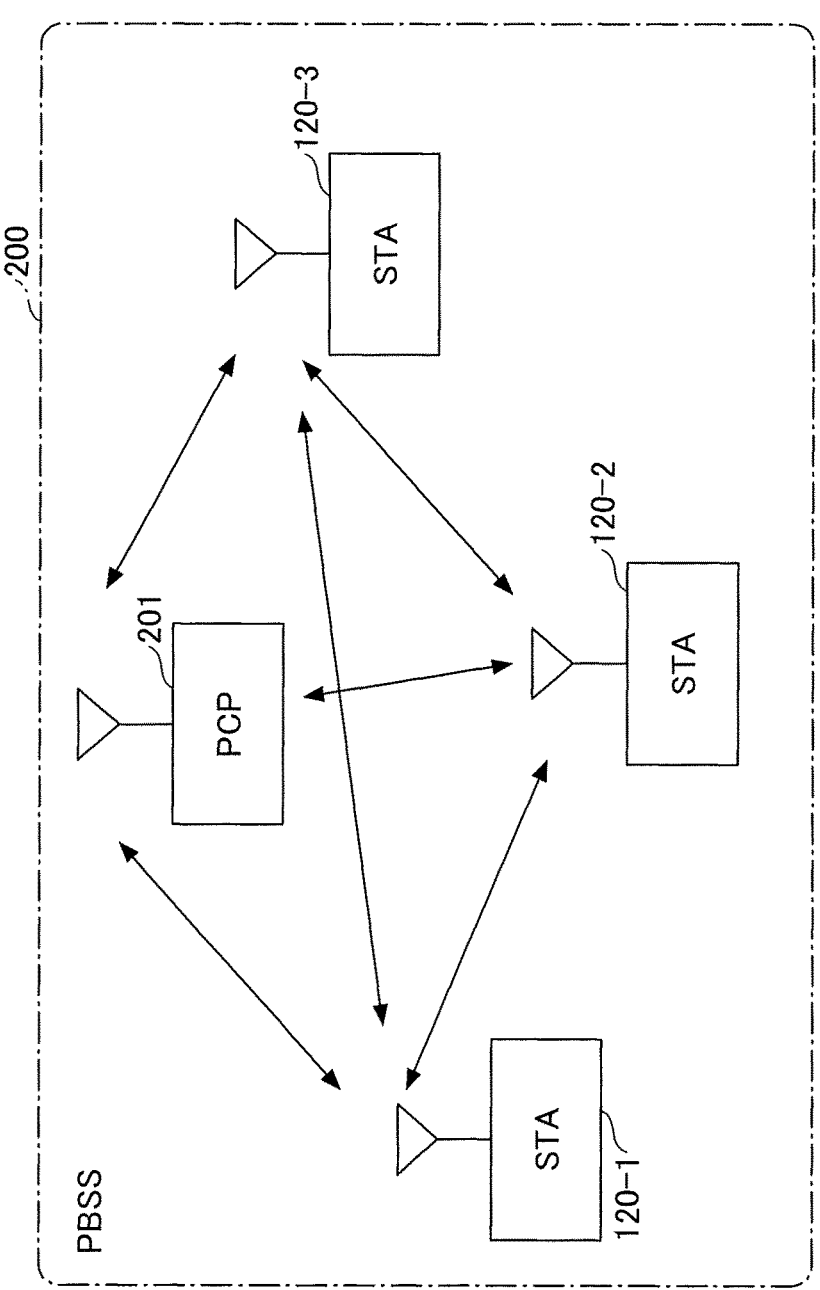
FIGS. 2A and 2B are schematic diagrams of a millimeter wave wireless communication system according to an embodiment.

IEEE 802.11ad defines, in addition to the network configurations illustrated in FIGS. 1A and 1B, a network called personal basic service set (PBSS), such as a PBSS 200 illustrated in FIG. 2A constructed by a coordinator device called a PBSS control point (PCP). In the PBSS 200, each of the STAs 120-1, 120-2, and 120-3 can communicate with another STA either directly or via the PCP 201.

Descriptions below are on the assumption that the mmWave wireless communication system according to the present embodiment is combined with a wireless communication device that performs communication in one-on-one or star topology network illustrated in FIGS. 1A and 1B. Aspects of this disclosure can adapt to PBSS networks such as that illustrated in FIG. 2A.

Time Slot Configuration

Figure 2B:
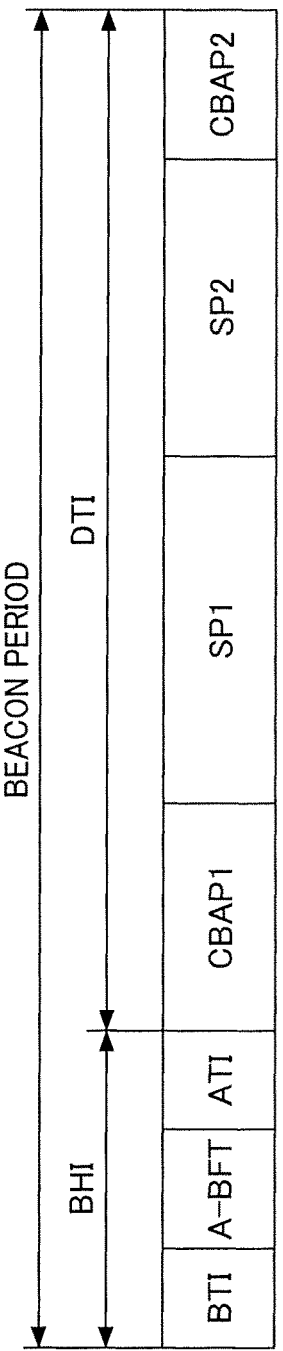

FIG. 2B illustrates an example of time slots according to an embodiment. FIG. 2A illustrates time slot allocation based on the TDMA protocol managed by the AP 110. In the time slot allocation according to TDMA protocol managed by the AP 110, one beacon period includes a beacon header interval (BHI) and a data transfer interval (DTI) as illustrated in FIG. 2B.

BHI includes a beacon transmission interval (BTI), association beamforming training (A-BFT), and an announcement transmission interval (ATI).

BTI is a period for the AP 110 to transmit a beacon frame. A-BFT is a training period of beamforming. The ATI is a period for transmission and reception of management information, control information, and the like between the AP 110 and the STAs 120-1 to 120-3.

DTI includes a contention based access period (CBAP) and a service period (SP).

The CBAP is a contention period allocated for the AP 110 and the plurality of STAs 120 to perform communication in contention. SP is a period dedicated for communication between the AP 110 and one STA 120.

In BTI, the AP 110 transmits as many beacon frames as the number of antenna sectors, which are a plurality of beam patterns formed by the AP 110. By contrast, the STAs 120-1 to 120-3 set antennas thereof to an omnidirectional antenna or a quasi-omnidirectional antenna to receive all beacon frames transmitted from the AP 110 and feed back information of a most sensitive antenna sector to the AP 110. Then, the AP 110 can determine which of the antenna sectors is to be used to communicate with each of the STAs 120-1 to 120-3.

Beamforming

As one example of beamforming technologies, sector level sweep (SLS) is described briefly below.

There are two types of SLS, namely, Tx sector sweep (TXSS) and Rx sector sweep (RXSS). TXSS is beamforming training to determine the antenna sector to be used in transmission, and RXSS is beamforming training to determine the antenna sector to be used in reception.

Figure 3:
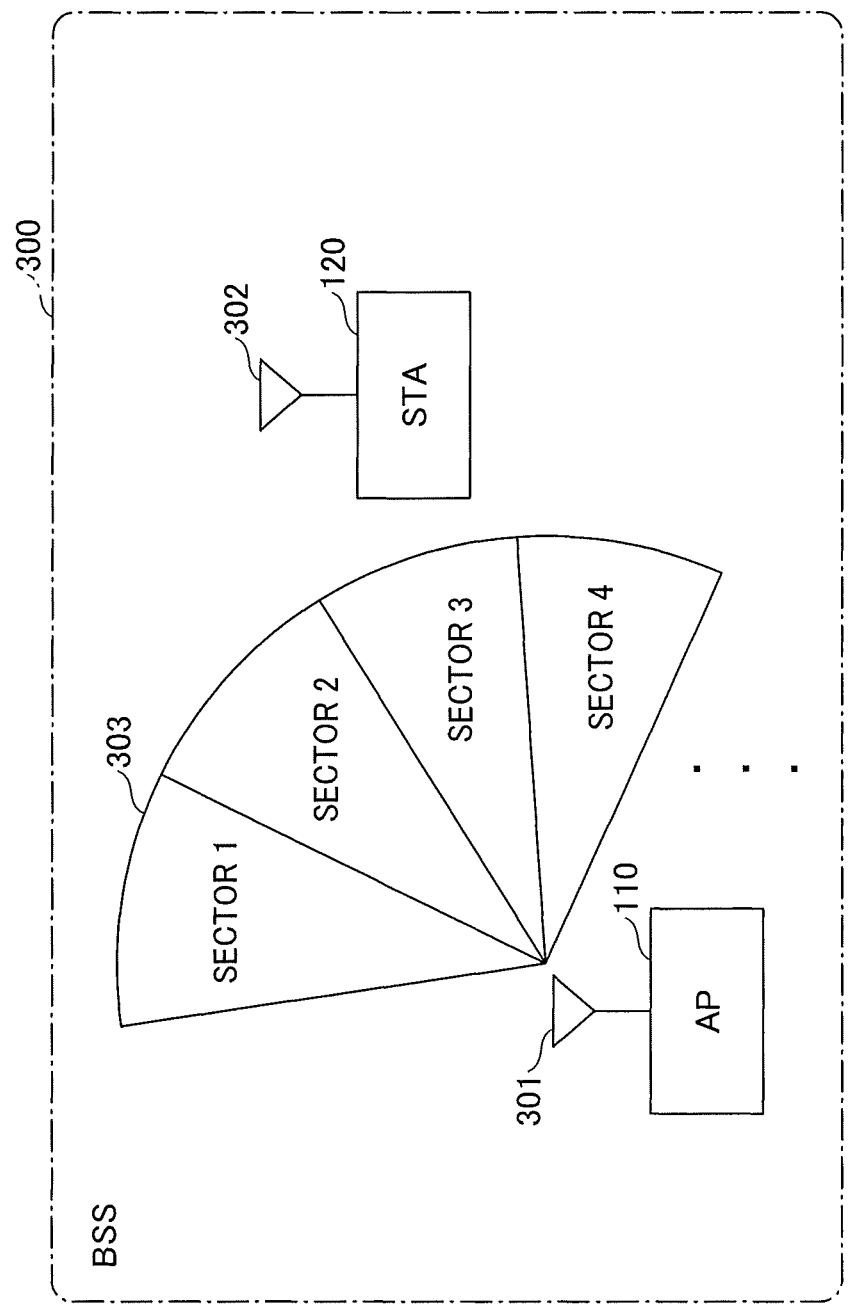
FIG. 3 is an illustration for explaining a beamforming according to an embodiment.

FIG. 3 is an illustration for explaining a beamforming according to the present embodiment. For ease of understanding, FIG. 3 illustrates only four sectors 1 to 4 of the antenna sectors, which are beam patterns generated by the AP 110.

In TXSS, while switching among the sectors 1 to 4 of a beam pattern 303, the AP 110 sequentially transmits a predetermined packet from an antenna 301, thereby generating a BSS 300. Meanwhile, the STA 120 sets an antenna 302 to an omnidirectional antenna or a quasi-omnidirectional antenna to receive all packets transmitted from the AP 110 and feeds back information of a most sensitive antenna sector to the AP 110.

In RXSS, a beamforming training sequence is performed in the direction opposite to that in the description above. As TXSS and RXSS are completed, the AP 110 and the STA 120 can perform transmission and reception of radio wave in mmWave wireless communication therebetween.

System Configuration

A functional configuration of a communication system according to an embodiment is described.

Figure 4:
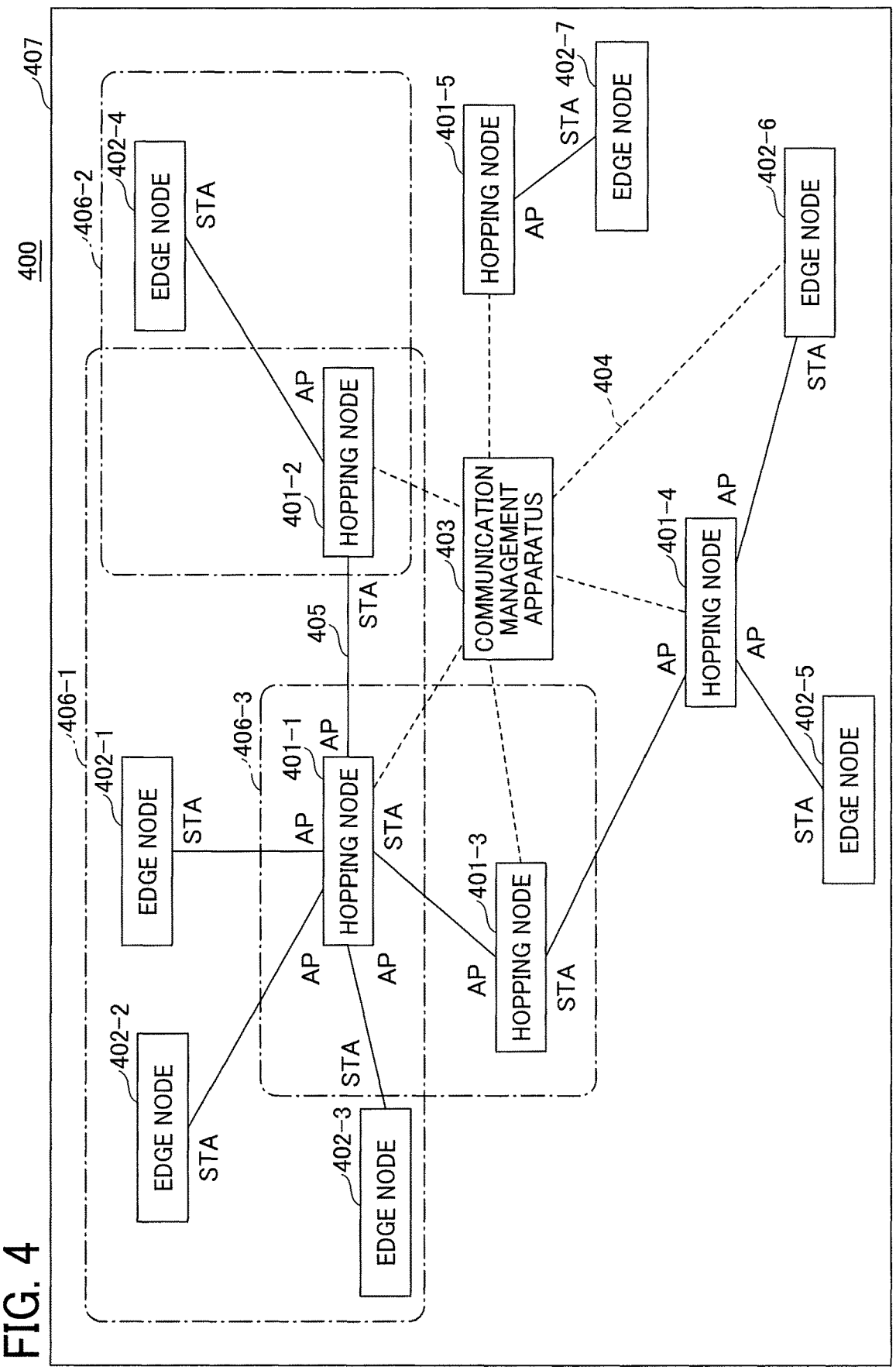
FIG. 4 illustrates an example configuration of a communication system according to an embodiment.

FIG. 4 illustrates an example configuration of a communication system 400 according to the present embodiment. For example, the communication system 400 includes a plurality of hopping nodes 401-1, 401-2, 401-3, 401-4, and 401-5, at least one edge node (edge nodes 402-1, 402-2, 402-3, 402-4, 402-5, 402-6, and 402-7), and a communication management apparatus 403. Note that, in the description below, any one of the plurality of hopping node 401-1 to 401-5 is referred to as "hopping node 401", and any one of the plurality of the edge nodes 402-1 to 402-7 (at least one edge node) is referred to as "edge node 402".

The hopping node 401 (a first communication device) is a communication device including a first communication module functioning as a mmWave wireless communication AP, a second communication module functioning as a mmWave wireless communication STA, and a third communication module to perform wireless LAN communication. Note that mmWave wireless communication is one example of first wireless communication using a directive radio wave, and wireless LAN communication is one example of second wireless communication having a wider communication range than that of the first wireless communication.

The plurality of hopping nodes 401-1 to 401-5 generate, with the first communication modules (APs), different network cells (BSS) of mmWave wireless communication. For example, in FIG. 4, the hopping node 401-1 generates a network cell 406-1, the hopping node 401-2 form a network cell 406-2, and the hopping node 401-3 generates a network cell 406-3. Similarly, other hopping nodes form network cells, respectively.

Further, the hopping node 401 can use the second communication module (STA) to connect to the network cells generated by other hopping nodes. In the example illustrated in FIG. 4, the hopping node 401-2 can perform mmWave wireless communication with the network cell 406-1 generated by the first communication module (AP) of the hopping node 401-1, using the second communication module (STA). Further, with the second communication module (STA), the hopping node 401-1 can perform mmWave wireless communication with the network cell 406-3 generated by the first communication module (AP) of the hopping node 401-3. Similarly, with the second communication module (STA), the hopping node 401-3 can perform mmWave wireless communication with the network cell generated by the first communication module (AP) of the hopping node 401-4.

Additionally, the plurality of hopping nodes 401-1 to 401-5 is included in a wireless LAN 407 same as the network including the communication management apparatus 403 and capable of wireless LAN communication with the communication management apparatus 403 using a third communication module. The access point of the wireless LAN communication can be either the communication management apparatus 403 or another access point.

The edge node 402 (a second communication device) includes a fourth communication unit functioning as a station (STA) of mmWave wireless communication and connects to one of the plurality of network cells generated by the edge nodes 402. In the example illustrated in FIG. 4, the edge nodes 402-1 to 402-3 connect, with the fourth communication unit (STA), to the network cell 406-1 generated by the first communication module (AP) of the hopping node 401-1.

Although not a requisite, the edge node 402 can includes another communication unit for wireless LAN communication. For example, connection lines 404 (broken lines) in FIG. 4 represent connection between the devices in wireless LAN communication. In FIG. 4, the edge node 402-6 can communicate with the communication management apparatus 403 via the wireless LAN. Similarly, the plurality of hopping nodes 401-1 to 401-5 supports wireless LAN communication with the communication management apparatus 403.

In the above-described configuration, each hopping node 401 uses the second communication module (STA) to collect information of peripheral communication devices in mmWave wireless communication and transmits the collected information to the communication management apparatus 403 in wireless LAN communication.

The communication management apparatus 403 (a third communication device) uses the information received in wireless LAN communication from each hopping node 401 to identify mmWave wireless connection relations between the devices, as indicated by connection lines 405 (solid lines) illustrated in FIG. 4. Further, when multi-hop data communication in mmWave wireless communication is performed, the communication management apparatus 403 determines data communication path based on the identified connection relation and transmits, in wireless LAN communication, an instruction on communication path to the hopping node 401 located on the communication path.

According to the instruction on the communication path transmitted in wireless LAN communication from the communication management apparatus 403, the hopping node 401 transfers data received by one of the first and second communication modules to another communication device with the other communication unit.

As described above, in the present embodiment, the hopping node 401 includes two mmWave communication units and can transfer data received by one of the two communication units to another communication device with the other communication unit. This facilitates streaming transfer of video and voice data.

Hardware Configuration

Hardware Configuration of Hopping Node

Figure 5A:
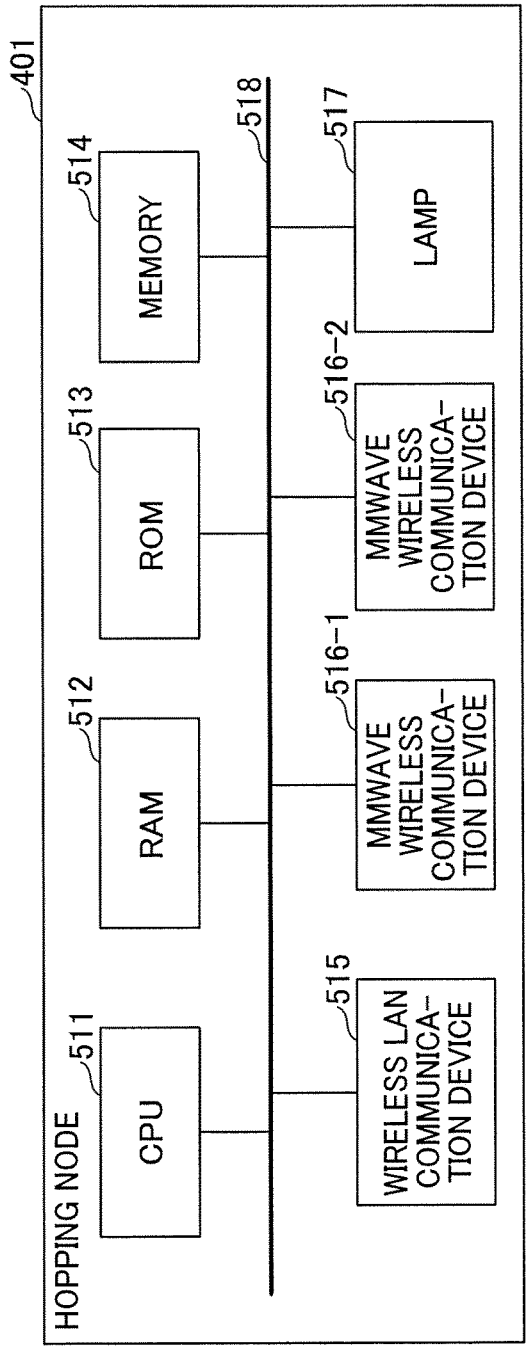
FIGS. 5A and 5B are block diagrams illustrating an example hardware configuration of a hopping node and an edge node according to an embodiment.

FIG. 5A is an example hardware configuration of the hopping node 401. For example, the hopping node 401 includes a central processing unit (CPU) 511, a random access memory (RAM) 512, a read only memory (ROM) 513, a memory 514, a wireless LAN communication device 515, mmWave wireless communication devices 516-1 and 516-2, a lamp 517, and a bus 518.

The CPU 511 is a processor that retrieves programs and data stored in, for example, the ROM 513 and the memory 514 to the RAM 512 and executes processing to implement functions of the hopping node 401. The RAM 512 is a volatile memory to be used as a work area for the CPU 511. The ROM 513 is a non-volatile memory that can keep storing the programs and the data even after turned off and back on.

The memory 514 is a device, such as a hard disk drive (HDD), a solid state drive (SSD), or a flash ROM, and stores an operating system (OS), an application program, and various types of data.

The wireless LAN communication device 515 is a wireless communication device for wireless LAN communication conformable to standards such as IEEE 802.11a/b/g/n/ac and includes, for example, an antenna, a radio, a media access control (MAC) device, and a communications controller.

The mmWave wireless communication devices 516-1 and 516-2 are wireless communication devices for mmWave wireless communication conformable to standards such as IEEE 802.11ad and includes, for example, an antenna, a radio, a MAC device, and a communications controller.

The lamp 517 is a light-emitting element to indicate the operation state of the hopping node 401 with, for example, color change, turning-on, and turning-off. The bus 518 is connected to each of the above-described elements and transmits address signals, data signals, and various types of control signals.

Hardware Configuration of Edge Node

Figure 5B:
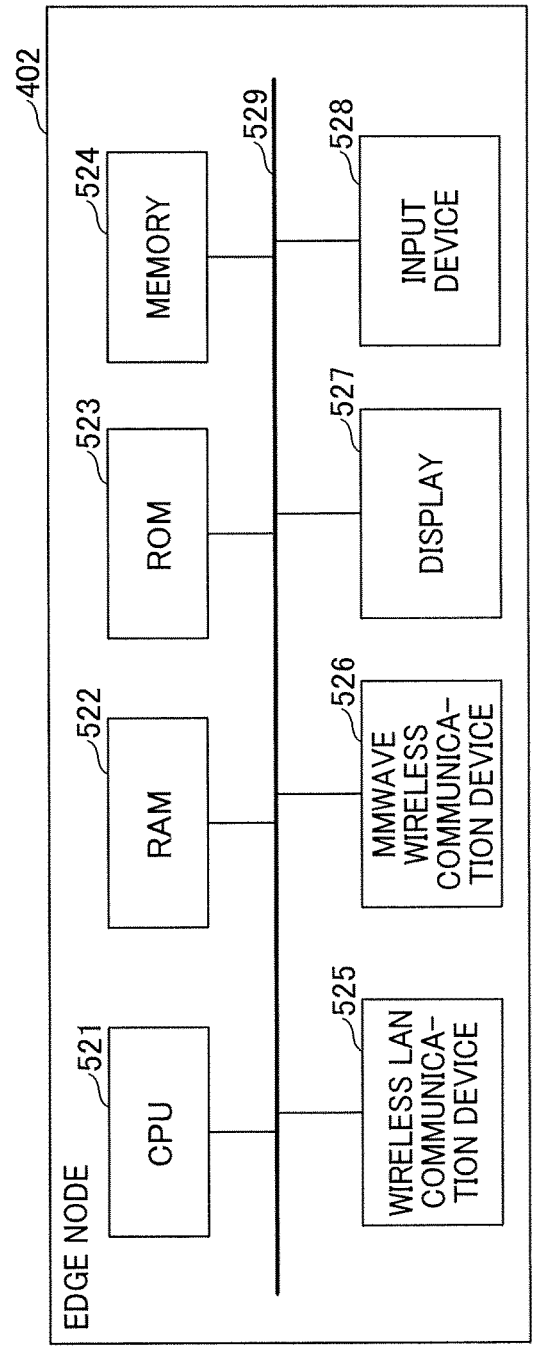

FIG. 5B is an example hardware configuration of the edge node 402. For example, the edge node 402 includes a CPU 521, a RAM 522, a ROM 523, a memory 524, a wireless LAN communication device 525, a mmWave wireless communication device 526, a display 527, an input device 528, and a bus 529. The configurations of the CPU 521, the RAM 522, the ROM 523, the memory 524, the wireless LAN communication device 525, the mmWave wireless communication device 526, and the bus 529 are similar to those of the components of the hopping node 401, and thus redundant descriptions are omitted.

The display 527 is, for example, a liquid crystal (LC) display and provides a display screen. The input device 528 is, for example, a touch panel or a keyboard that accepts an input operation by a user.

Note that the configuration of the edge node 402 illustrated in FIG. 5B is a mere example and the wireless LAN communication device 525 can be omitted.

Hardware Configuration of Communication Management Apparatus

Figure 6:
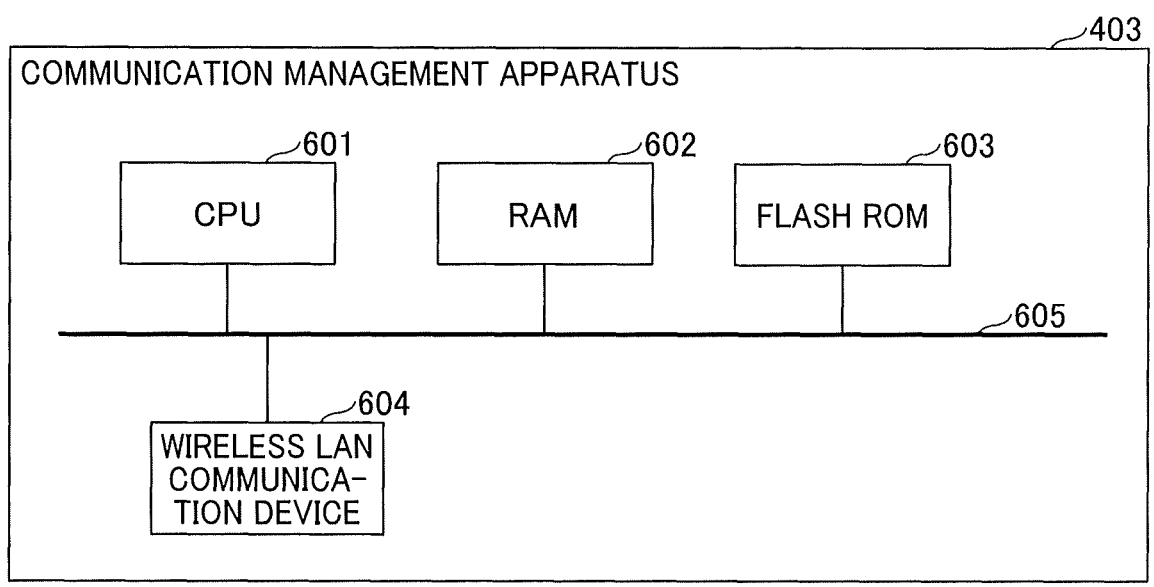
FIG. 6 is a block diagram illustrating a hardware configuration of the communication management apparatus according to an embodiment.

FIG. 6 is a block diagram illustrating a hardware configuration of the communication management apparatus 403. For example, the communication management apparatus 403 includes a CPU 601, a RAM 602, a flash ROM 603, a wireless LAN communication device 604, and a bus 605.

The CPU 601 is a processor that executes programs stored in, for example, the flash ROM 603 to implement functions of the communication management apparatus 403. The RAM 602 is a volatile memory to be used as a work area for the CPU 601. The flash ROM 603 is a non-volatile, rewritable memory that can keep storing programs and data even after turned off and back on.

The wireless LAN communication device 604 is a wireless communication device for wireless LAN communication. The bus 605 is connected to each of the above-described elements and transmits address signals, data signals, and various types of control signals.

Functional Configuration

Now, a description is given of functional configurations of the devices.

Functional Configuration of Hopping Node

Figure 7:
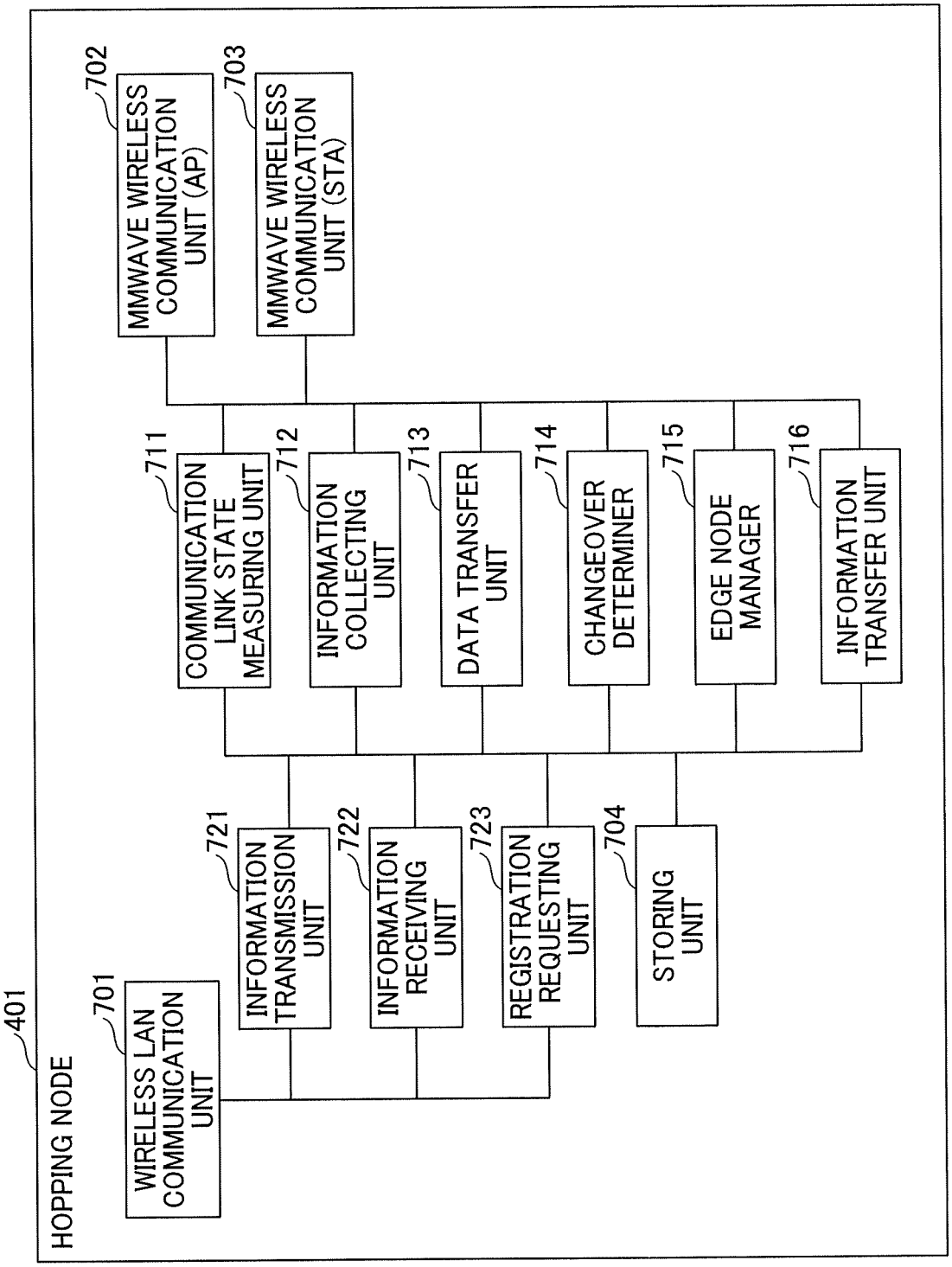
FIG. 7 is a functional block diagram of the hopping node illustrated in FIG. 4.

FIG. 7 is a functional block diagram of the hopping node 401 according to the present embodiment. The hopping node 401 (the first communication device) includes a wireless LAN communication unit 701, a mmWave wireless communication unit 702 (AP), a mmWave wireless communication unit 703 (STA), and a storing unit 704. The hopping node 401 further includes a communication link state measuring unit 711, an information collecting unit 712, a data transfer unit 713, a changeover determiner 714, an edge node manager 715, and an information transfer unit 716. The hopping node 401 further includes an information transmission unit 721, an information receiving unit 722, and a registration requesting unit 723.

The wireless LAN communication unit 701 (the third communication module) is implemented, for example, by the wireless LAN communication device 515 illustrated in FIG. 5A and the program executed by the CPU 511 illustrated in FIG. 5A. The wireless LAN communication unit 701 connects to the wireless LAN 407 and performs wireless LAN communication with the communication management apparatus 403.

The mmWave wireless communication unit 702 (AP) is implemented, for example, by the mmWave wireless communication device 516-1 illustrated in FIG. 5A and the program executed by the CPU 511 illustrated in FIG. 5A. The mmWave wireless communication unit 702 (AP) functions as an access point of mmWave wireless communication and generates a mmWave wireless network cell. Further, the mmWave wireless communication unit 702 (AP) performs data transmission and reception in mmWave wireless communication with the mmWave wireless communication STA connected to the network cell. The mmWave wireless communication unit 702 (AP) is one example of the first communication module.

The mmWave wireless communication unit 703 (STA) is implemented, for example, by the mmWave wireless communication device 516-2 illustrated in FIG. 5A and the program executed by the CPU 511 illustrated in FIG. 5A. The mmWave wireless communication unit 703 (STA) functions as a station (STA) of mmWave wireless communication and connects to the mmWave wireless network cell generated by another hopping node. Further, the mmWave wireless communication unit 703 (STA) performs data transmission and reception in mmWave wireless communication with other hopping nodes forming the network cell. The mmWave wireless communication unit 703 (STA) is one example of the second communication module.

The storing unit 704 is implemented, for example, by the RAM 512 and the memory 514 illustrated in FIG. 5A and the program executed by the CPU 511 illustrated in FIG. 5A and functions as a buffer to temporarily store, for example, data received in mmWave wireless communication. The storing unit 704 further stores various types of information such as access point information transmitted from the communication management apparatus 403 and information of the edge node 402 connected to the network cell generated by the mmWave wireless communication unit 702 (AP).

The communication link state measuring unit 711 is implemented, for example, by the program executed by the CPU 511 illustrated in FIG. 5A. The communication link state measuring unit 711 measures (or determines) communication link states of other communication devices (e.g., the hopping nodes 401 and the edge nodes 402) communicable with the mmWave wireless communication unit 702 (AP) and the mmWave wireless communication unit 703 (STA). The term "communication link states" includes information such as signal strength, throughput, and packet loss rate.

The information collecting unit 712 is implemented, for example, by the program executed by the CPU 511 illustrated in FIG. 5A and collects information of the peripheral communication devices (the hopping nodes 401 and the edge nodes 402) in mmWave wireless communication.

For example, the information collecting unit 712 acquires, with the communication link state measuring unit 711, identification information (identifier such as hopping node number) and information such as communication link states of other hopping nodes around the hopping node 401. Further, the information collecting unit 712 acquires, with the communication link state measuring unit 711, identification information (identifier such as edge node number) and information such as communication link states of other edge nodes around the hopping node 401.

The information collected by the information collecting unit 712 is transmitted, for example, by the information transmission unit 721 to the communication management apparatus 403 in wireless LAN communication.

The data transfer unit 713 is be implemented, for example, by the program executed by the CPU 511 illustrated in FIG. 5A. The data transfer unit 713 is configured to transfer the data received by one of the two mmWave wireless communication units to a different communication device with the other communication unit, according to the instruction on the communication path transmitted via the wireless LAN from the communication management apparatus 403. For example, the data transfer unit 713 transfers the data received by the mmWave wireless communication unit 702 (AP) to a recipient communication device, which is specified by the instruction on the communication path transmitted in wireless LAN communication from the communication management apparatus 403, with the mmWave wireless communication unit 703 (STA).

The changeover determiner 714 is implemented, for example, by the program executed by the CPU 511 illustrated in FIG. 5A and determines whether to switch the communication path to another path based on the communication link state measured by the communication link state measuring unit 711.

The edge node manager 715 (a device manager) is implemented, for example, by the program executed by the CPU 511 illustrated in FIG. 5A and manages the edge nodes 402 connected to the network cell generated by the mmWave wireless communication unit 702 (AP). For example, the edge node manager 715 registers, in the hopping node 401, the edge node 402 that has connected to the network cell generated by the mmWave wireless communication unit 702 (AP) and notifies the registered edge node 402 of an internet protocol (IP) address and the like.

The information transfer unit 716 is implemented, for example, by the program executed by the CPU 511 (in FIG. 5A) and relays information transmitted between the edge node 402 and the communication management apparatus 403. For example, responding to the request from the edge node 402, the information transfer unit 716 transfers the information received in mmWave wireless communication from the edge node 402 to the communication management apparatus 403 in wireless LAN communication. Further, responding to the request from the communication management apparatus 403, the information transfer unit 716 transfers the information received in wireless LAN communication from the communication management apparatus 403 to the edge node 402 in mmWave wireless communication.

The information transmission unit 721 is implement, for example, by the program executed by the CPU 511 illustrated in FIG. 5A and transmits, with the wireless LAN communication unit 701, information to the communication management apparatus 403. For example, the information transmission unit 721 transmits the information about peripheral communication devices, collected by the information collecting unit 712, to the communication management apparatus 403 in wireless LAN communication.

The information receiving unit 722 is implement, for example, by the program executed by the CPU 511 illustrated in FIG. 5A and receives, with the wireless LAN communication unit 701, information from the communication management apparatus 403. For example, the information receiving unit 722 receives control information such as instructions on the communication path, sent from the communication management apparatus 403 in wireless LAN communication.

The registration requesting unit 723 is implemented, for example, by the program executed by the CPU 511 illustrated in FIG. 5A. For example, at power on, the registration requesting unit 723 transmits a registration request including information of the peripheral communication devices collected by the information collecting unit 712, to the communication system 400 in wireless LAN communication.

Functional Configuration of Edge Node

Figure 8:
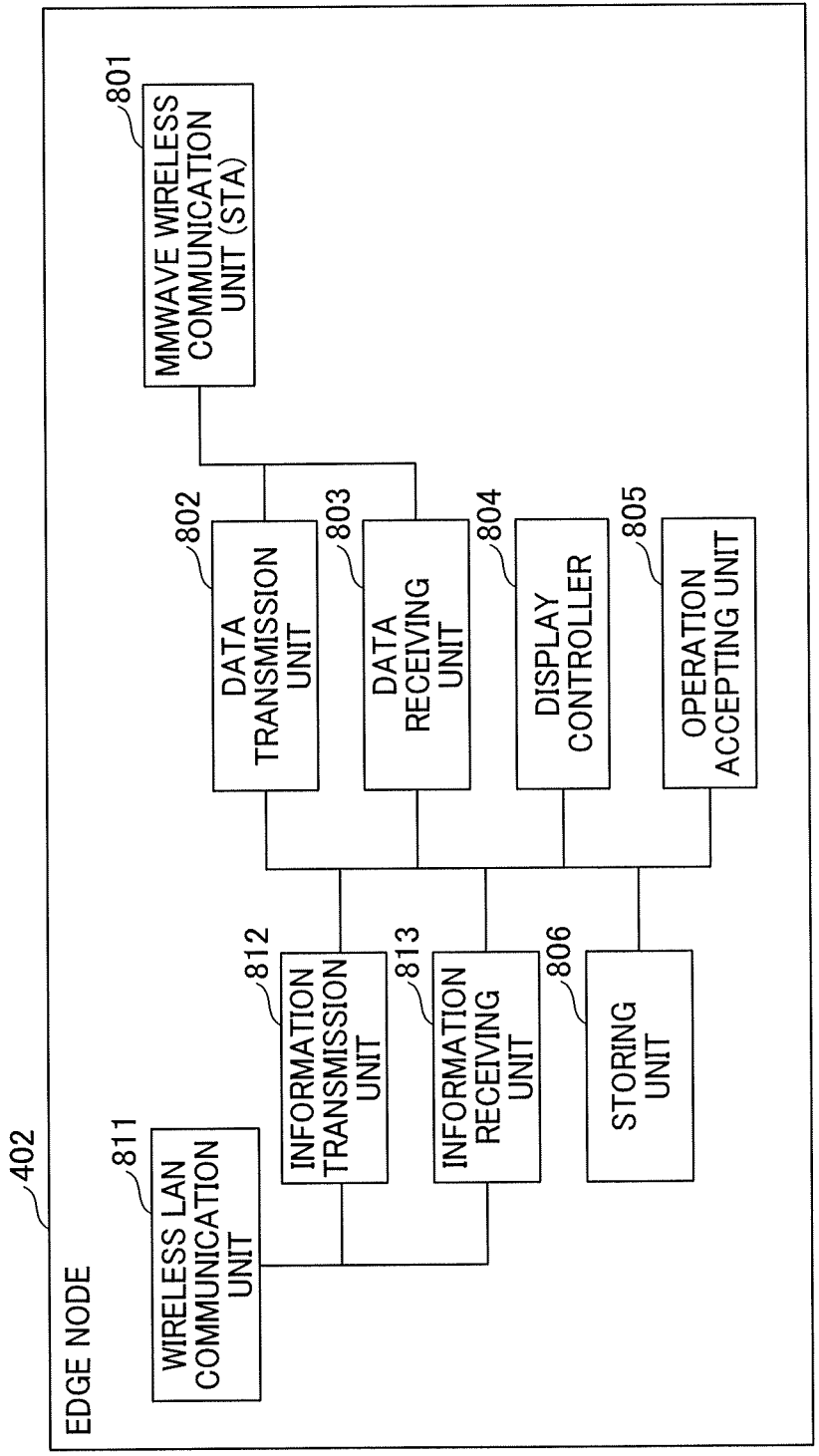
FIG. 8 is an example functional block diagram of the edge node illustrated in FIG. 4.

FIG. 8 is an example functional block diagram of the edge node 402 according to the present embodiment. The edge node 402 includes a mmWave wireless communication unit 801 (STA), a data transmission unit 802, a data receiving unit 803, a display controller 804, an operation accepting unit 805, and a storing unit 806.

Preferably, the edge node 402 includes a wireless LAN communication unit 811, an information transmission unit 812, and an information receiving unit 813.

The mmWave wireless communication unit 801 (STA) is implemented, for example, by the mmWave wireless communication device 526 illustrated in FIG. 5B and the program executed by the CPU 521 illustrated in FIG. 5B. The mmWave wireless communication unit 801 connects, as a STA, to the mmWave wireless network cell. The mmWave wireless communication unit 801 (STA) is one example of the fourth communication unit to perform mmWave wireless communication (first wireless communication).

The data transmission unit 802 is implemented, for example, by the program executed by the CPU 521 illustrated in FIG. 5B and transmits, with the mmWave wireless communication unit 801 (STA), data such as video data, voice data, and files in mmWave wireless communication.

The data receiving unit 803 is implemented, for example, by the program executed by the CPU 521 illustrated in FIG. 5B and receives, with the mmWave wireless communication unit 801 (STA), data such as video data, voice data, and files in mmWave wireless communication.

The display controller 804 is implemented, for example, by the program executed by the CPU 521 illustrated in FIG. 5B and displays, on the display 527 illustrated in FIG. 5B, an operation screen and video received by the data receiving unit 803.

The operation accepting unit 805 is implemented, for example, by the program executed by the CPU 521 illustrated in FIG. 5B and accepts user input operated on the input device 528 illustrated in FIG. 5B.

For example, the storing unit 806 stores video data, voice data, and files received by the data receiving unit 803.

The wireless LAN communication unit 811 is implemented, for example, by the wireless LAN communication device 525 illustrated in FIG. 5B and the program executed by the CPU 521 illustrated in FIG. 5B and performs wireless LAN communication with the communication management apparatus 403 and the like.

The information transmission unit 812 is implement, for example, by the program executed by the CPU 521 illustrated in FIG. 5B and transmits information, via wireless LAN with the wireless LAN communication unit 811, to the communication management apparatus 403. The edge node 402 can transmit, for example, request of data transmission in multi-hop communication to the communication management apparatus 403, with the information transmission unit 812.

The information receiving unit 813 is implement, for example, by the program executed by the CPU 521 illustrated in FIG. 5B and receives, with the wireless LAN communication unit 811, control information and the like from the communication management apparatus 403.

Functional Configuration of Communication Management Apparatus

The communication management apparatus 403 includes a wireless LAN communication unit 901, an information acquisition unit 902, a communication path determiner 903, a control information transmission unit 904, a hopping node manager 905, an edge node manager 906, and a storing unit 907.

The wireless LAN communication unit 901 (a fifth communication unit) is implemented, for example, by the wireless LAN communication device 604 illustrated in FIG. 6 and the program executed by the CPU 601 illustrated in FIG. 6 and performs wireless LAN communication with the hopping node 401, the edge node 402, and the like.

The information acquisition unit 902 (an acquisition unit) is implemented, for example, by the program executed by the CPU 601 illustrated in FIG. 6 and acquires information of peripheral communication devices from the plurality of hopping nodes 401 in wireless LAN communication.

For example, at regular intervals (regularly), the information acquisition unit 902 transmits a scan request, requesting acquisition of information, to the plurality of hopping nodes 401 in wireless LAN communication and acquires the information of the peripheral communication devices transmitted from the plurality of hopping nodes 401.

The communication path determiner 903 is implemented, for example, by the program executed by the CPU 601 illustrated in FIG. 6 and determines a communication path that is a route for transferring data via multi-hop communication, based on the information acquired by the information acquisition unit 902.

For example, the communication path determiner 903 uses the information acquired by the information acquisition unit 902 to identify the connection relation in mmWave wireless communication between the devices, as indicated by the connection lines 405 (solid lines) illustrated in FIG. 4. Then, the communication path determiner 903 determines a multi-hop communication path based on the determined connection relations.

The control information transmission unit 904 is implemented, for example, by the program executed by the CPU 601 illustrated in FIG. 6 and transmits control information to the hopping nodes 401 and the like in wireless LAN communication. For example, the control information transmission unit 904 transmits instructions on the communication path including a data transfer destination, to the hopping node 401 on the communication path determined by the communication path determiner 903.

The hopping node manager 905 is implemented, for example, by the program executed by the CPU 601 illustrated in FIG. 6 and manages the information of the hopping nodes 401 registered in the communication system 400 based on the information acquired by the information acquisition unit 902.

The edge node manager 906 is implemented, for example, by the program executed by the CPU 601 illustrated in FIG. 6 and manages the information of the edge nodes 402 of the communication system 400 based on the information acquired by the information acquisition unit 902.

Operation Flow

Descriptions are given below of a flow of communication control processing according to embodiments.

Embodiment 1

Registration of Hopping Node

FIG. 10 is a sequence chart illustrating an example of registration of hopping node according to Embodiment 1. As an example, the processing is performed when the hopping node 401 starts up and is registered in the communication management apparatus 403. In FIG. 10 and subsequent sequence charts, broken arrows represent wireless LAN communication.

As the hopping node 401 is activated by power-on or turning on by a user at S1001, S1002 and subsequent steps are performed.

At S1002, the hopping node 401 connects to the communication management apparatus 403 via wireless LAN communication. For example, the wireless LAN communication unit 701 of the hopping node 401 searches for the communication management apparatus 403 via network broadcast (multicast) and requests wireless LAN connection to the retrieved communication management apparatus 403.

At S1003, the hopping node 401 accepts a response from the communication management apparatus 403 and, at S1004, scans other communication devices in mmWave wireless communication. For example, the information collecting unit 712 of the hopping node 401 collects, with the mmWave wireless communication unit 703 (STA) and the communication link state measuring unit 711, information of other hopping nodes around the hopping node 401.

At S1005, the hopping node 401 transmits a registration request requesting registration in the communication system 400, to the communication management apparatus 403 in wireless LAN communication. For example, the information transmission unit 721 of the hopping node 401 transmits the registration request to the communication management apparatus 403 in wireless LAN communication, using the wireless LAN communication unit 701. The registration request includes the information (e.g., identifier and radio wave intensity) of other hopping nodes, collected by the information collecting unit 712.

At S1006, accepting the registration request from the hopping node 401, the communication management apparatus 403 registers the hopping node 401 in the communication system 400. For example, the hopping node manager 905 of the communication management apparatus 403 stores, in the storing unit 907, the information of other hopping nodes included in the registration request received from the hopping node 401. Further, the hopping node manager 905 determines access point information to be sent to the hopping node 401. The access point information includes, for example, a service set identifier (SSID), an encryption key, a communication channel, and an internet protocol (IP) address, used by the mmWave wireless communication unit 702 (AP) of the hopping node 401. The SSID, the IP address, and the like are examples of information for identifying the mmWave wireless network cell.

At S1007, the communication management apparatus 403 transmits a notification of registration completion, which includes a registration number and access point information, to the hopping node 401 in wireless LAN communication. For example, the control information transmission unit 904 of the communication management apparatus 403 transmits, with the wireless LAN communication unit 901, the notification of registration completion to the hopping node 401 being the sender of request, and the notification of registration completion includes the access point information determined by the hopping node manager 905 and the registration number assigned at the time of registration.

At S1008, the hopping node 401 uses the access point information sent from the communication management apparatus 403 to activate the access point (AP) of mmWave wireless communication and a dynamic host configuration protocol (DHCP) server. For example, the mmWave wireless communication unit 702 (AP) of the hopping node 401 uses the SSID, the encryption key, the communication channel, the IP address, and the like included in the received access point information to generate a mmWave wireless network cell (BSS).

Note that the information of mmWave wireless access point can be preliminarily set in the communication management apparatus 403, and, for example, an identical SSID can be sent to all hopping nodes 401 registered in the communication system 400.

The information sent from the hopping node 401 to the communication management apparatus 403 can further include distance information to other hopping nodes. Using the distance information, the communication management apparatus 403 can grasp the distance between the hopping nodes or relative positions thereof. For example, the communication management apparatus 403 can assign different communication channels to the hopping nodes 401 adjacent to each other, thereby reducing radio interference in mmWave wireless communication.

Identification of Connection Relations

FIG. 11 is a sequence chart illustrating an example of identification of connection relations according to Embodiment 1. This is one example processing to identify mmWave wireless connection relations between communication devices, indicated by the connection lines 405 (solid lines) illustrated in FIG. 4. For ease of understanding, the description below is on the assumption that the communication system 400 includes a hopping node A 401a, a hopping node B 401b, and a hopping node C 401c (also collectively "hopping nodes 401").

The communication management apparatus 403 executes the processing illustrated in FIG. 11, for example, at regular intervals, to identify connection relations between the communication devices (e.g., the hopping node 401 and the edge node 402) in the communication system 400.

From S1101 to S1103, the communication management apparatus 403 transmits, in wireless LAN communication, scan requests to the hopping node A 401a, the hopping node B 401b, and the hopping node C 401c registered in the communication system 400. For example, the hopping node manager 905 of the communication management apparatus 403 transmits, with the wireless LAN communication unit 901, the scan request requesting scan of other communication devices in mmWave wireless communication, to the registered hopping node 401.

In response to the scan requests, at S1104 to S1106, the hopping node A 401a, the hopping node B 401b, and the hopping node C 401c scan peripheral communication devices in mmWave wireless communication.

For example, the information collecting unit 712 of the hopping node 401 collects information (e.g., identifiers and communication link states) of other hopping nodes communicable in mmWave wireless communication and information (e.g., identifiers and communication link states) of the edge nodes 402 communicable in mmWave wireless communication.

From S1107 to S1109, the hopping node A 401a, the hopping node B 401b, and the hopping node C 401c transmit the scan results to the communication management apparatus 403 in wireless LAN communication. The scan results include the information of other communication devices (the hopping node 401 and the edge node 402) collected in S1104 to S1106.

In this example, the hopping node A 401a generates the scan result including information of the hopping node B 401b and the hopping node C 401c, and the hopping node B 401b generates the scan result including information of the hopping node A 401a and the hopping node C 401c. Further, the hopping node C 401c generates the scan results including information of the hopping node A 401a and the hopping node B 401b.

At S1110, the communication management apparatus 403 uses the respective scan results received from the hopping nodes 401 (401a, 401b, and 401c) to generate (or update) a management table 1210, for example, illustrated in FIG. 12A.

FIG. 12A illustrates an example management table. In the example illustrated in FIG. 12A, the management table 1210 includes "hopping node identifier", "identifier of retrieved hopping node", and "radio wave intensity".

The "hopping node identifier" is information for identifying the hopping node 401 that has transmitted the scan result. In this example, for simplicity, the hopping node A 401a, the hopping node B 401b, and the hopping node C 401c are given identifiers "A", "B", and "C" as identification information, respectively.

The "identifier of retrieved hopping node" is the identifier of another hopping node retrieved in scanning by the hopping node 401 that has transmitted the scan result.

The "radio wave intensity" is strength of radio wave from another hopping node, received by the hopping node 401 that has transmitted the scan result. The larger the value, the intensity of radio wave is stronger.

At S1111 in FIG. 11, the communication path determiner 903 of the communication management apparatus 403 identifies the connection relations between the communication devices registered in the communication system 400, using the management table 1210 illustrated in FIG. 12A.

As one example, the communication path determiner 903 refers to the management table 1210 and generates a mmWave wireless connection pair having a strongest radio intensity, of other hopping nodes 401 retrieved by each hopping node 401.

For example, the communication path determiner 903 selects, in the management table 1210, a pair 1211 of the hopping node A 401a (given identifier "A") and the hopping node B 401b (given identifier "B") having a strongest radio wave intensity with the hopping node A 401a. Similarly, the communication path determiner 903 selects a pair 1212 of the hopping node B 401b and the hopping node C 401c, and a pair 1213 of the hopping node C 401c and the hopping node B 401b.

Since a communication loop (a closed path) is generated by such selecting, the communication path determiner 903 excludes the pair 1212 that is the weakest in radio wave intensity of the pairs 1211 to 1213, thereby canceling the communication loop. With this processing, the mmWave wireless communication pairs 1211 and 1213 are identified as mmWave wireless connection relations. In other words, the communication path determiner 903 determines that the hopping node A 401a is connectable in mmWave wireless communication to the hopping node B 401b, and the hopping node C 401c is connectable in mmWave wireless communication to the hopping node B 401b.

The radio wave intensity is one example of information for identifying the connection relation. Alternatively, the communication path determiner 903 can use a communication link state such as distance, error rate, or throughput value to determine mmWave wireless connection relations.

FIG. 12B illustrates a management table 1220 as one example management table for the communication path determiner 903 to determine mmWave wireless connection relations using radio wave intensity and distance.

It is known that the distance between nodes can be measured with a high accuracy in mmWave wireless communication since the frequency bandwidth used therein is wide. In a configuration where the distance information between nodes is managed in the management table 1220, for example, when the network includes a plurality of hopping nodes 401 similar in radio intensity, the communication path determiner 903 can select the closer of the hopping nodes 401. In the example illustrated in FIG. 12B, since the two hopping nodes retrieved by the hopping node C 401c have radio wave intensity of "80", the communication path determiner 903 can select the hopping node B 401b that is the closer of the two.

Preferably, in determining mmWave wireless connection relations, the communication path determiner 903 limits, to a predetermined number (e.g., two, which can be determined based on empirical data and stored in a memory), the number of other hopping nodes connected to the network cell generated by each hopping node 401 because of the following inconvenience. For example, in a case where the number of nodes connectable to one network cell is fixed, if a large number of hopping nodes 401 are connected to one network cell, the number of edge nodes 402 connectable to that network cell is undesirably limited.

Although the description above concerns the hopping nodes 401, when the scan result received from each hopping node 401 includes information of the edge nodes 402, the communication path determiner 903 determines connection relations of the edge nodes 402. Note that, in the present embodiment, since the edge node 402 connects to one network cell, the connection relations between the hopping nodes 401 and the edge nodes 402 can be uniquely identified based on the scan results.

With the above-described operation, the communication path determiner 903 of the communication management apparatus 403 identifies the connection relations between the plurality of communication devices (the hopping nodes 401 and the edge nodes 402) of the communication system 400. Additionally, as described later, the communication path determiner 903 determines the multi-hop communication path using the connection relations identified here.

Note that, when the communication path determiner 903 recognizes any hopping node 401 not capable of mmWave wireless communication with another hopping node 401 at S1111 in FIG. 11, the communication path determiner 903 notifies that hopping node 401 of non-connected state in wireless LAN communication. For example, when the communication path determiner 903 determines that the hopping node C 401c is not capable of mmWave wireless communication at S1111, an operation starting at S1112 is performed.

At S1112, the communication path determiner 903 of the communication management apparatus 403 notifies, in wireless LAN communication, the hopping node C 401c of not capable of mmWave wireless communication.

At S1113, in response to the notification from the communication management apparatus 403, the hopping node C 401c causes the lamp 517 to blink. Then, the user can take an action (e.g., change the position of the hopping node C 401c) to cope with the connection problem.

Deletion of Hopping Node

FIG. 13 is a sequence chart illustrating an example of deletion of hopping node, according to Embodiment 1. This is example processing performed when the hopping node 401 does not respond to the scan request from the communication management apparatus 403.

At S1301 and S1302, as described above, the communication management apparatus 403 transmits scan request, in the wireless LAN communication, to the hopping nodes 401 registered in the communication system 400, for example, at regular intervals.

At S1303, in response to the scan request sent in wireless LAN communication, the hopping node A 401a scans periphery communication devices in mmWave wireless communication. At S1304, the hopping node A 401a transmits a scan result to the communication management apparatus 403.

In this example, the communication management apparatus 403 does not receive a scan result from the hopping node B 401b for some reason.

At S1305, when the hopping node manager 905 of the communication management apparatus 403 determines that the period of reception of scan result from any hopping node 401 has exceeded a threshold, the hopping node manager 905 determines timeout of scan result.

For example, the hopping node manager 905 determines that receipt of scan result from the hopping node B 401b is timeout when the time during which (or number of times) a scan result is not received is equal to or greater than a threshold.

Until the timeout determination is made, the communication management apparatus 403 continues to transmit the scan request at regular intervals in wireless LAN communication to each hopping node 401 (S1311 and S1312).

By contrast, in response to timeout determination, at S1321, the hopping node manager 905 of the communication management apparatus 403 deletes (or nullifies) the registration of the hopping node B 401b against which timeout determination is made.

With this action, transmission of scan request to the hopping node B 401b is canceled after S1322.

Thus, the communication management apparatus 403 deletes (or nullifies) the registration, in the communication system 400, of the hopping node 401 from which the scan result is not received for a period (or number of times) exceeding the threshold.

Registration of Edge Node

Figure 14:
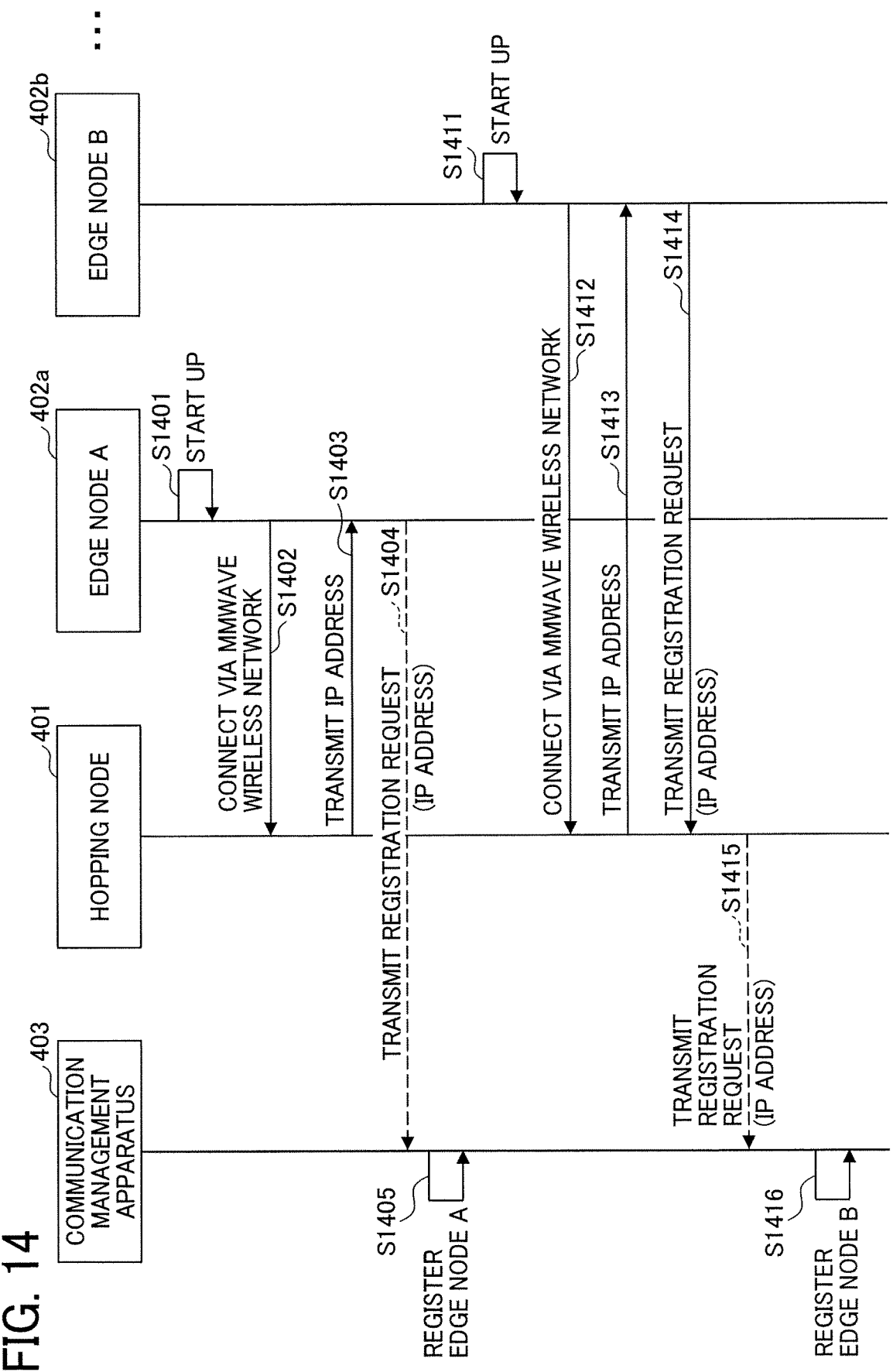
FIG. 14 is a sequence chart illustrating an example of registration of the edge node according to Embodiment 1.

FIG. 14 is a sequence chart illustrating an example of registration of the edge node 402 according to Embodiment 1. In this example, the communication management apparatus 403 registers the edge node 402 in the communication system 400.

At S1401, an edge node A 402a including the wireless LAN communication unit 811 is activated, for example, by an operation made by a user.

At S1402, the edge node A 402a connects, with the mmWave wireless communication unit 801 (STA), to the hopping node 401 in mmWave wireless communication.

At S1403, the mmWave wireless communication unit 702 (AP) of the hopping node 401 permits connection of the edge node A402a and transmits an IP address to the edge node A402a.

At S1404, the edge node A 402a transfers the registration request including the IP address sent from the hopping node 401, to the communication management apparatus 403 in wireless LAN communication.

At S1405, in response to the registration request from the edge node A 402a, the communication management apparatus 403 registers the edge node A 402a in the communication system 400. For example, the edge node manager 906 of the communication management apparatus 403 stores the IP address included in the registration request received from the edge node A 402a, in association with the identifier of the edge node A 402a, in the storing unit 907.

Thus, the edge node A 402a is registered in the communication system 400. Note that, in a configuration in which the edge node 402 does not have the wireless LAN communication unit 811, the edge node 402 is registered, for example, through the operation starting from S1411.

At S1411, the edge node B 402b without the wireless LAN communication unit 811 is activated, for example, by an operation made by a user.

At S1412, the edge node B 402b connects, with the mmWave wireless communication unit 801 (STA), to the hopping node 401 in mmWave wireless communication.

At s1413, the mmWave wireless communication unit 702 (AP) of the hopping node 401 permits the connection of the edge node B 402b and notifies the edge node B 402b of an IP address.

At S1414, the edge node B 402b transmits the registration request including the IP address sent from the hopping node 401, to the hopping node 401 in mmWave wireless communication.

At S1415, in response to reception of the registration request addressed to the communication management apparatus 403, transmitted from the edge node B 402b, the information transfer unit 716 of the hopping node 401 transfers the registration request to the communication management apparatus 403 in wireless LAN communication.

At S1416, in response to the registration request from the edge node B 402b via the hopping node 401, the communication management apparatus 403 registers the edge node B 402b in the communication system 400.

As described above, the edge node 402 can be configured to communicate with the communication management apparatus 403 via the hopping node 401.

In the above-described registration of nodes, the hopping node 401 uses the mmWave wireless communication unit 702 (AP) as an access point and the mmWave wireless communication unit 703 (STA) as a station.

The hopping node 401 that has received the notification of registration completion from the communication management apparatus 403 uses the SSID, the communication channel, and the encryption key of mmWave wireless communication included in the notification to activate the access point and generate a mmWave wireless network cell (a sub-network).

Further, the hopping node 401 assigns the IP address included in the notification of registration completion to itself and, simultaneously, activates a DHCP server for mmWave wireless communication. The hopping node 401 actively assigns an IP address to the edge node 402 that joins the mmWave wireless network cell of the hopping node 401.

Preferably, based on the mmWave wireless communication scan result (collected information), the communication management apparatus 403 generates a pair of an access point of the hopping node 401 and a station of another hopping node having a high communication quality (strong radio intensity).

Additionally, the communication management apparatus 403 determines (calculates) mmWave wireless connection relations (topology) constructed by the hopping nodes 401 so that the stations of all hopping nodes 401 connect to one of the access points.

Further, the communication management apparatus 403 adjusts (calculates) the topology so that the number of the stations of the hopping nodes 401 connected to the access point of each hopping node 401 does not exceed the threshold. Then, the communication management apparatus 403 notifies each hopping node 401 of the calculation result in wireless LAN communication before starting data communication.

Preferably, the communication management apparatus 403 uses a transmission control protocol (TCP) or user datagram protocol (UDP) throughput value when determining (calculating) the mmWave wireless connection relations (topology) of the hopping nodes 401.

In this case, each hopping node 401 activates a TCP or UDP server after activating the mmWave wireless access point.

Further, each hopping node 401 connects to the access point of the hopping node 401 known from the scan result by mmWave wireless communication and performs TCP or UDP communication for a while to measure the throughput value. Then, each hopping node 401 notifies the communication management apparatus 403 of the measured result.

Preferably, the communication management apparatus 403 uses the distance to each hopping node 401 when determining (calculating) the mmWave wireless connection relations (topology) of the hopping nodes 401. When the communication quality between the access point and the station is identical, the communication management apparatus 403 selects the closer of the hopping nodes 401 to generate the connection pair.

Further, in response to reception of scan request (scam command message) from the communication management apparatus 403, each hopping node 401 executes scanning in mmWave wireless communication and simultaneously measures the distance to other hopping nodes 401. Then, each hopping node 401 notifies the communication management apparatus 403 of the results.

Data Transmission

Descriptions are given below of multi-hop data transmission using mmWave wireless communication.

Figure 15:
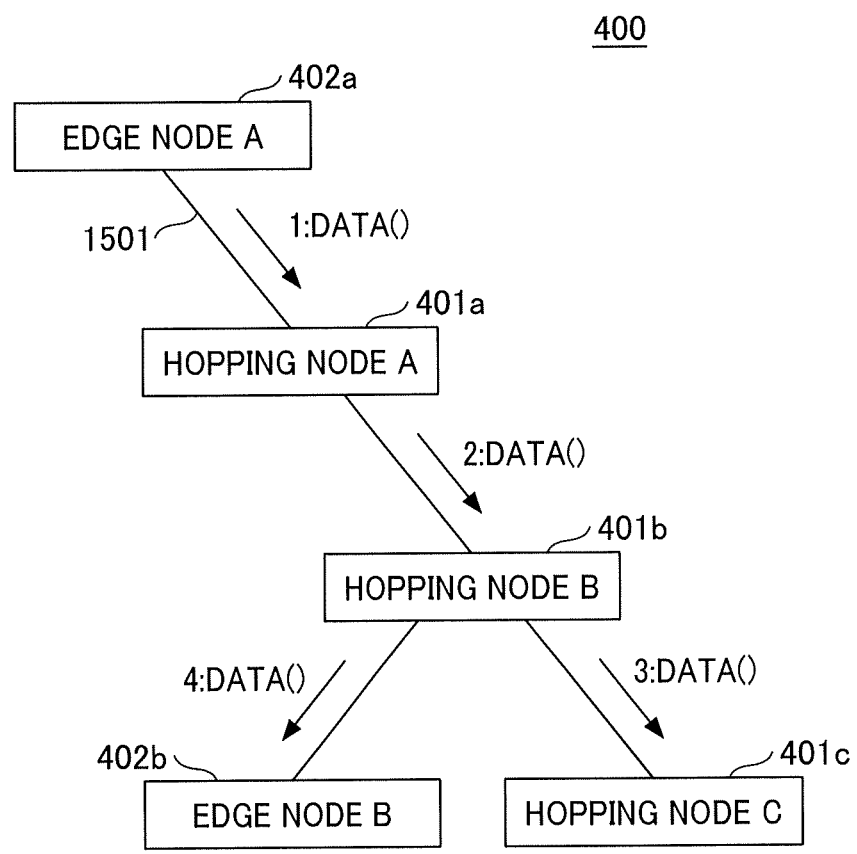
FIG. 15 is a diagram for explaining an example of first data transmission.

FIG. 15 is an illustration for explaining example data transmission according to Embodiment 1. In the example illustrated in FIG. 15, the communication system 400 includes the hopping node A 401*a*, the hopping node B 401*b*, the hopping node C 401*c*, the edge node A 402*a*, and the edge node B 402*b*. The description below is on the assumption that mmWave wireless connection relations, indicated by solid lines 1501 in FIG. 15, have been determined through the connection relation determination illustrated in FIG. 11.

In this case, for example, the edge node A 402*a* can deliver data such as video or voice data to other communication devices (the hopping nodes 401 and the edge nodes 402) in multi-hop communication, as indicated by arrows illustrated in FIG. 15.

Figure 16:
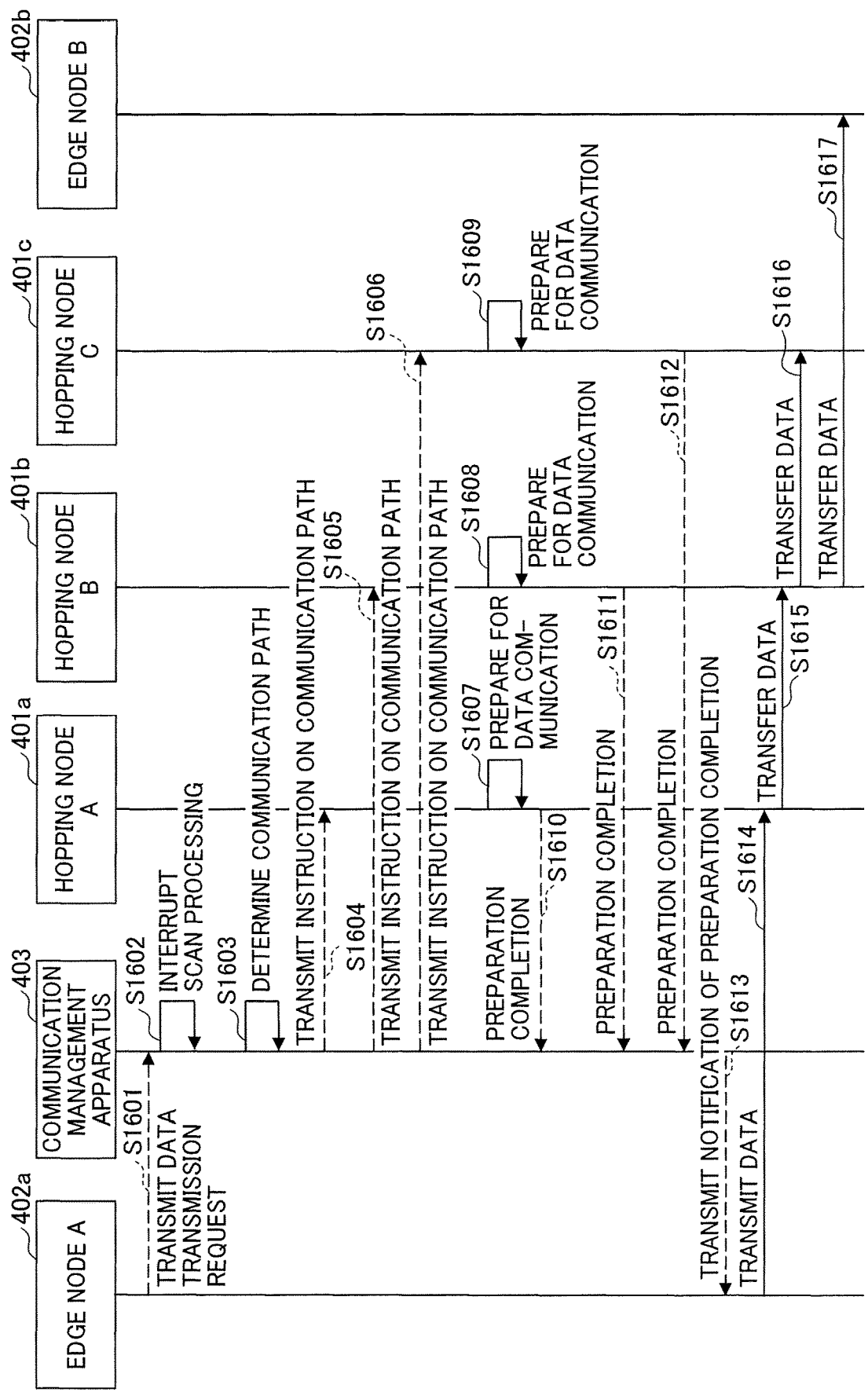
FIG. 16 is a sequence chart illustrating an example of data transmission according to Embodiment 1.

FIG. 16 is a sequence chart illustrating an example of data transmission according to Embodiment 1. FIG. 16 illustrates an example in which the edge node A 402*a* delivers data to other communication devices in the communication system 400 illustrated in FIG. 15.

At S1601, the edge node A 402*a* transmits a request to transmit data (request information for data transmission), to the communication management apparatus 403, for example, in wireless LAN communication. Note that in a configuration in which the edge node 402 does not have the wireless LAN communication unit 811, the edge node 402 can transmit the data transmission request in mmWave wireless communication via the hopping node 401, as illustrated as S1414 and S1415 in FIG. 14.

At S1602, the communication management apparatus 403 accepts the data transmission request and interrupts scan processing, in which scan request is transmitted to each hopping node 401 at regular intervals.

At S1603, the communication path determiner 903 of the communication management apparatus 403 determines the multi-hop communication path, for example, using the mmWave wireless connection relations determined in the determination processing illustrated in FIG. 11. For example, the communication path determiner 903 determines a sender IP address and a recipient IP address regarding each hopping node 401 of the communication system 400 illustrated in FIG. 15.

In the example illustrated in FIG. 15, regarding the hopping node A 401*a*, the sender IP address is the IP address of the edge node A 402*a*, and the recipient IP address is the IP address of the hopping node B 401*b*. Regarding the hopping node B 401*b*, the sender IP address is the IP address of the hopping node A 401*a*, and the recipient IP addresses are the IP address of the hopping node C 401*c* and the IP address of the edge node B 402*b*. Further, regarding the hopping node C 401*c*, the sender IP address is the IP address of the hopping node B 401*b*, and there is no recipient IP address.

Available as the IP addresses of the hopping nodes 401 are those stored in the storing unit 907 and managed by the hopping node manager 905 of the communication management apparatus 403. Available as the IP addresses of the edge nodes 402 are those stored in the storing unit 907 and managed by the edge node manager 906 of the communication management apparatus 403.

In steps from S1604 to S1606, the control information transmission unit 904 of the communication management apparatus 403 transmits, in wireless LAN communication, instructions of the communication path to each hopping node 401 located on the communication path determined by the communication path determiner 903.

For example, the control information transmission unit 904 notifies each hopping node 401 on the communication path of the sender IP address, the recipient IP address, identification information and encryption key of mmWave wireless communication AP, and information about data to be transferred.

In the case of streaming transfer in multi-hop communication, the information about data to be transferred includes a port number to be used and a multicast address. In the case of file transfer in multi-hop communication, the information about data to be transferred includes file list information such as file name and file size.

In steps S1607 to S1609, the data transfer unit 713 of each hopping node 401 receiving the instruction on the communication path prepares for multi-hop communication.

For example, in the case of streaming transfer in multi-hop communication, each hopping node 401 opens a transmission and reception socket and sets a data transfer rule. In the case of file transfer in multi-hop communication, each hopping node 401 opens a reception socket.

In steps from S1610 to S1612, as the preparation for multi-hop communication is completed, each hopping node 401 notifies the communication management apparatus 403 of preparation completion, in wireless LAN communication.

At S1613, in response to reception of preparation completion from all hopping nodes 401 on the multi-hop communication path, the control information transmission unit 904 of the communication management apparatus 403 transmits a notification indicating completion of preparation for data transmission, to the edge node A 402a. This notification indicating completion of preparation includes designation of data recipient (the hopping node A 401a in this example).

At S1614, the edge node A 402a transmits the data to the instructed recipient in mmWave wireless communication.

At S1615, the hopping node A 401a transfers the data received in mmWave wireless communication to the recipient instructed at S1604 (e.g., the hopping node B 401b) in mmWave wireless communication.

At that time, since the hopping node A 401a includes the mmWave wireless communication unit 702 (AP) and the mmWave wireless communication unit 703 (STA), the hopping node A 401a can transfer the data to another communication device with one communication unit white receiving the data with the other communication unit.

At S1616, the hopping node B 401b transfers the data received in mmWave wireless communication to one of the recipients instructed at S1605 (e.g., the hopping node C 401c) in mmWave wireless communication.

At S1617, the hopping node B 401b transfers the data received in mmWave wireless communication to another of the recipients instructed at S1605 (e.g., the edge node B 402b) in mmWave wireless communication.

Such processing is advantageous over a system in which, after receiving data from a sender communication device, a relay device shuts off mmWave wireless communication with the sender communication device and establishes millimeter wave wireless communication with a recipient communication device to transfer the data thereto. The processing illustrated in FIG. 16 facilitates streaming transfer of video or voice data in a communication system 400 that performs multi-hop communication using a directive radio wave.

Such advantage is not limited to mmWave wireless communication but is common to various types of communication systems to perform multi-hop communication using directive radio wave.

Figure 17B:
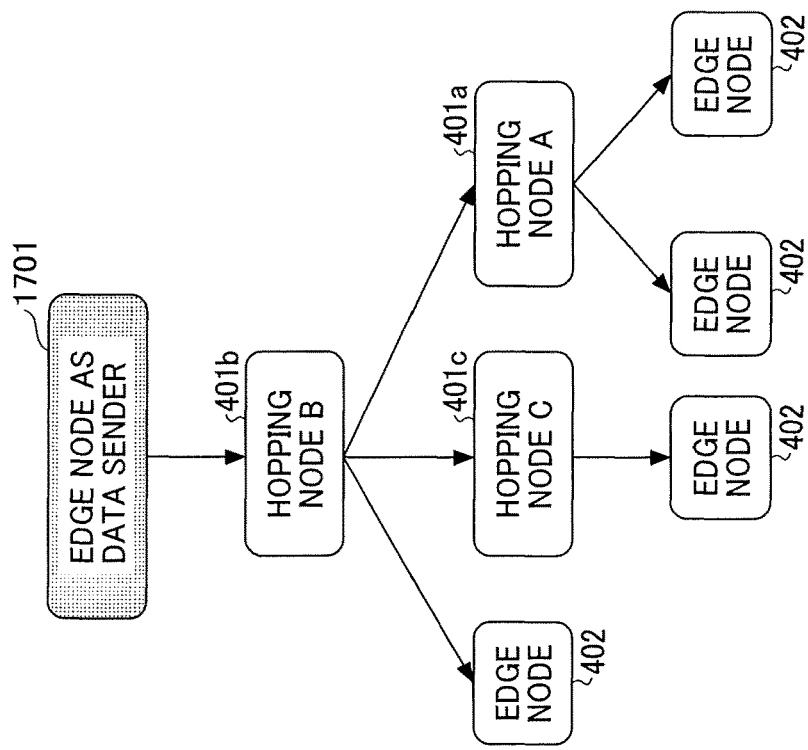
FIGS. 17A and 17B illustrate relations between connection relations and a communication path according to Embodiment 1.
Figure 17A:
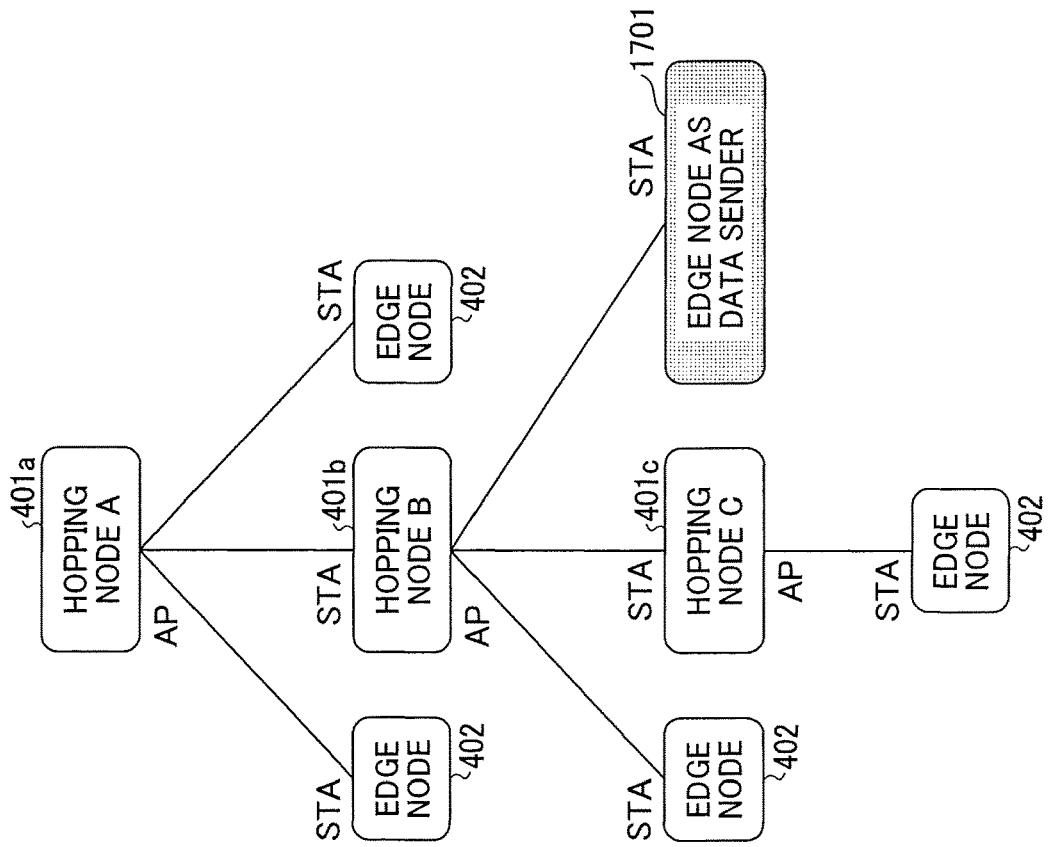

FIGS. 17A and 17B illustrate relations between connection relations and the communication path according to Embodiment 1.

FIG. 17A illustrates an example of mmWave wireless connection relations (topology) determined in the connection relation determination illustrated in FIG. 11. This example is on the assumption that an edge node 1701 being a sender delivers, in simultaneous delivery, same contents to all of other edge nodes so that the contents are shared thereby.

To determine the communication path, the communication path determiner 903 initially refers to the mmWave wireless topology and determines the nodes to which the data is sequentially transferred from the edge node 1701 (data sender) being a root. Then, the communication path determiner 903 determines the data sender and the data recipients. This operation generates a multi-hop communication path (IP communication path) having a tree structure, for example, illustrated in FIG. 17B (inevitably, an IP communication closed path is not generated.

Thus, the communication path determiner 903 determines a multi-hop communication path using mmWave wireless connection relations, thereby reducing the load in determining the communication path. Thus, determination of communication path is relatively easy. Note that the mmWave wireless connection relations and multi-hop communication path illustrated in FIGS. 17A and 17B are mere examples.

In the above-described data transfer, to start data transmission, the edge node 402 notifies the communication management apparatus 403 of transmission start in wireless LAN communication.

The communication management apparatus 403 sets the edge node 402 that has transmitted the notification as the sender in the mmWave wireless connection relation (topology) established at that time. Further, for each hopping node 401, the communication management apparatus 403 determines a sender hopping node IP address and at least one recipient hopping node IP address for mmWave wireless communication. Further, to each hopping node 401, the communication management apparatus 403 transmits IP address information, together with data transfer preparation parameters including an SSID of the mmWave wireless access point as connection destination and an encryption key.

In response to the data transfer preparation parameters, each hopping node 401 connects to the access point using the SSID and the encryption key specified in the received message and then prepares for receiving data from the sender IP address specified in the received message.

Further, as the preparation for receiving is completed, each of the hopping nodes 401 received the transmission preparation parameters transmits a response message indicating preparation completion to the communication management apparatus 403 in wireless LAN communication.

In a case where an identical SSID is used by the mmWave wireless access points of all hopping nodes 401, preferably, the communication management apparatus 403 transmits, to each hopping node 401, IP address information, together with data transfer preparation parameters including the SSID of the mmWave wireless access point as the connection destination and the encryption key after receiving the message requesting transmission start from the edge node 402.

Each hopping node 401 connects to the access point specified by the SSID included in the received message.

Preferably, the data transfer preparation parameters transmitted from the communication management apparatus 403 include, in addition to the SSID of the mmWave wireless access point being the connection destination and the encryption key, file attribute information such as at least one file name and file size in a case of file transfer (TCP). By contrast, in a case of streaming transfer (UDP), the data transfer preparation parameters transmitted from the communication management apparatus 403 include a multicast address and a port number used in streaming transfer.

When generating a mmWave wireless communication path (IP layer communication path), preferably, the communication management apparatus 403 avoids generation of an IP communication closed path.

Preferably, as all hopping nodes complete the preparation for receiving data, the communication management apparatus 403 transmits, in wireless LAN communication, a notification of transmission start to the edge node 402 being the data sender.

Each hopping node 401 receives the data from the hopping node 401 assigned with the sender IP address by the communication management apparatus 403, using one of the mmWave wireless communication devices (interfaces). Further, each hopping node 401 transmits the data to the hopping node 401 assigned with at least one sender IP address by the communication management apparatus 403, using the other mmWave wireless communication device (interface). As transmission of data to all hopping nodes 401 is completed, each hopping node 401 sequentially transfer the data to all edge nodes that belong to the mmWave wireless network cell (sub-network) of its own.

Preferably, each edge node 402 transmits a registration request to the communication management apparatus 403 in wireless LAN communication, when an IP address is assigned to the edge node upon connecting to the mmWave wireless access point (network cell) of any hopping node 401.

Based on the registration request received from the edge node 402, the communication management apparatus 403 can grasp the network cell to which the edge node 402 has connected, from the IP address assigned to each hopping node 401 and the IP address of the sender of the request.

First Communication Path Changeover

Figures 18A, 18B:
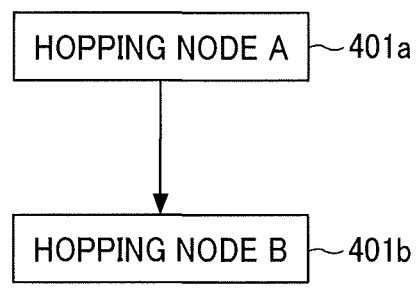
FIGS. 18A, 18B, 18C, and 18D are illustrations for explaining changeover of communication path according to Embodiment 1.

FIGS. 18A and 18B are illustrations for explaining changeover of communication path according to Embodiment 1.

For example, the hopping node B 401b performing mmWave wireless communication with the hopping node A 401a as illustrated in FIG. 18A keeps monitoring the mmWave wireless communication link state with the hopping node A 401a as illustrated in FIG. 18B and determines changeover of mmWave wireless communication path.

There is a plurality of conditions for the hopping node 401 to determine changeover of mmWave wireless communication path, for example, as follows.

Condition 1) mmWave wireless disconnection has occurred or connection is not established in response to a reconnection request after disconnection; Condition 2) mmWave wireless signal intensity or throughput value is equal to or lower than a threshold, or packet error rate is equal to or higher than a threshold; Condition 3) in the case of video or voice data streaming transfer, video data packet loss rate in a transport application layer is equal to or greater than a threshold; and Condition 4) in the case of video or voice data streaming transfer, in a transport application layer, a subsequent sequence number is not received with a sequence number included in a packet header for a predetermined period.

Under Condition 1, the hopping node B 401b can perform reconnection request once or multiple number of times, which is effective, for example, when an obstacle is temporarily present between the hopping node A 401a and the hopping node B 401b.

Under Condition 2, the hopping node 401 performs threshold determination based on a combination of various parameters (signal strength, throughput value, error rate, and the like) as illustrated in FIG. 19B. A moving average can be used at that time.

Regarding Condition 3, in video streaming transfer, for example, the packet loss rate threshold changes depending on video quality required by an application and quality.

Regarding Condition 4, similarly, the period depends on the frame rate and resolution of the video data.

In the case of video streaming transfer, particularly, changeover determination based only on Condition 1 (mmWave wireless communication parameters) is difficult. When Condition 1 is satisfied, it is preferred to make secondary determination based on Conditions 3 and 4 and change the path when Conditions 3 and 4 are satisfied.

Figure 18D:
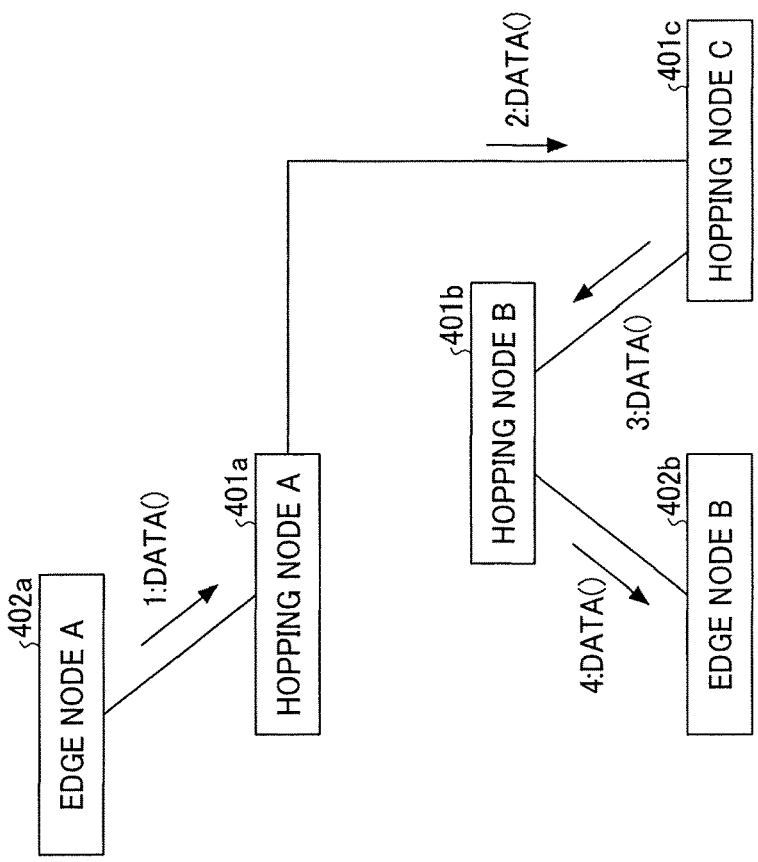
Figure 18C:
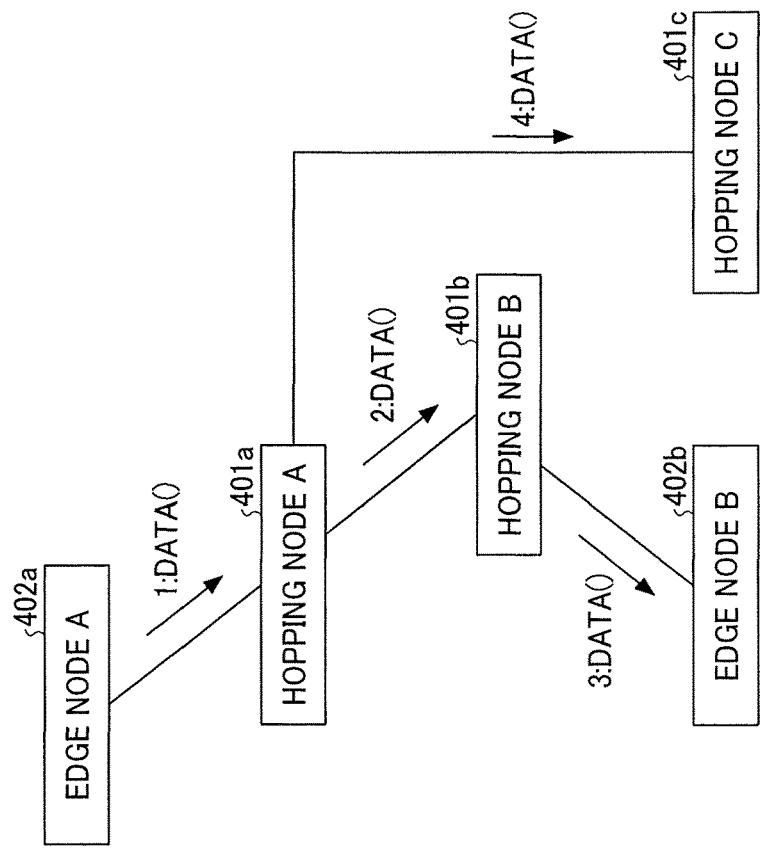

For example, in multi-hop communication using the communication path illustrated in FIG. 15, when the hopping node B 401b determines to change the communication path, the communication path from the hopping node A 401a is changed to connect to the hopping node C 401c as illustrated in FIG. 18C.

Figure 19:
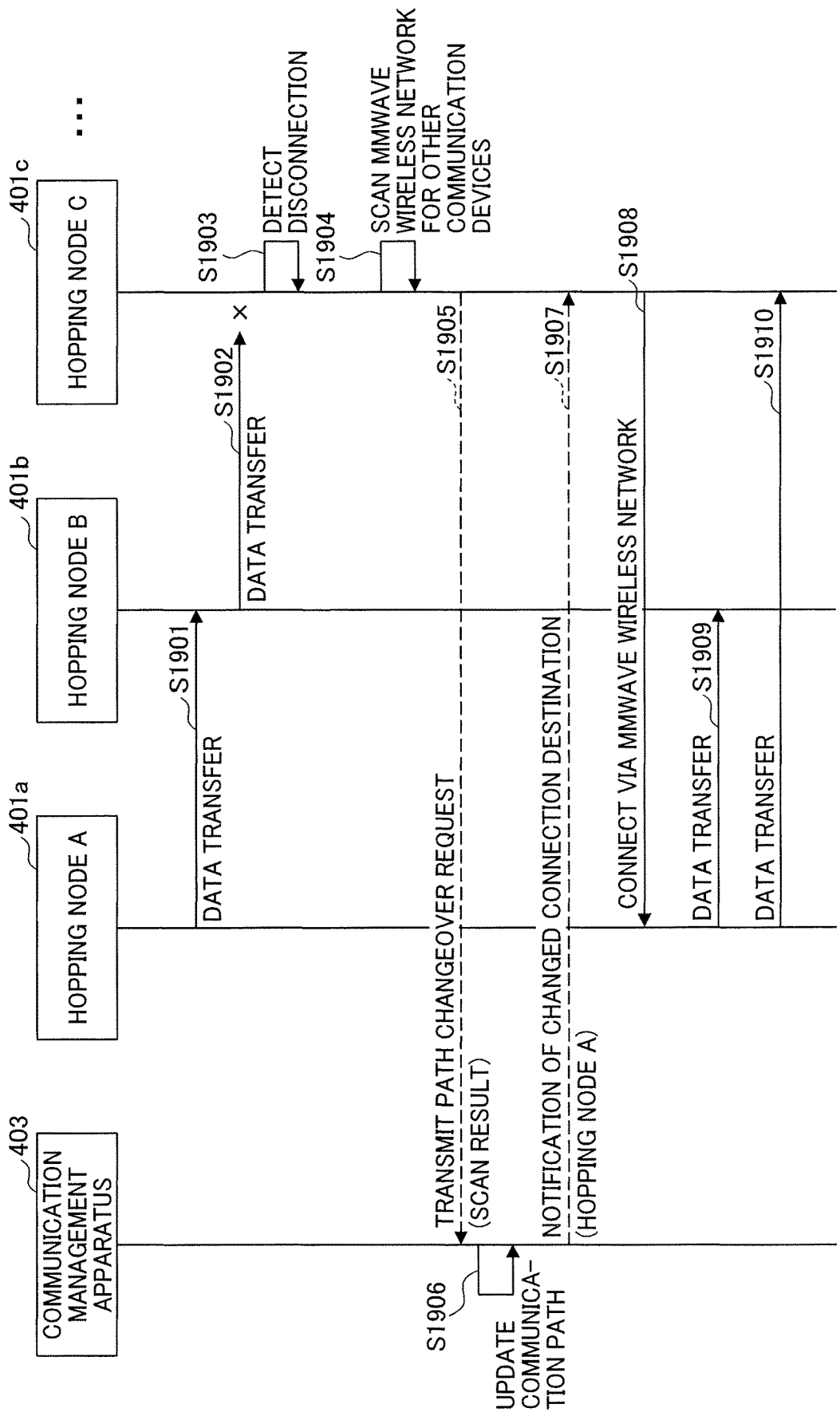
FIG. 19 is a sequence chart illustrating an example of communication path changeover according to Embodiment 1.

FIG. 19 is a sequence chart illustrating an example of communication path changeover according to Embodiment 1. Note that the processing illustrated in FIG. 19 is started in the communication system 400 performing multi-hop communication using the communication path illustrated in FIG. 15.

For example, at S1901, the hopping node B 401b receives data in mmWave wireless communication from the hopping node A 401a and, at S1902, transfers the received data to the hopping node C 401c in mmWave wireless communication.

At S1903, the changeover determiner 714 of the hopping node C 401c detects a disconnection of mmWave wireless connection with the hopping node B 401b. In this case, the changeover determiner 714 of the hopping node C 401c determines to change the mmWave wireless communication path and performs the processing starting at S1904.

At S1904, the changeover determiner 714 of the hopping node C 401c scans, with the information collecting unit 712, other communication devices in mmWave wireless communication.

At S1905, the changeover determiner 714 of the hopping node C 401c transmits a path changeover request requesting changeover of the communication path, to the communication management apparatus 403 in wireless LAN communication. The path changeover request includes, for example, the scan result of mmWave wireless communication.

At S1906, the communication path determiner 903 of the communication management apparatus 403 uses the scan result received from the hopping node C 401c to update the mmWave wireless connection relations and multi-hop communication path. Here, as one example, the multi-hop communication path illustrated in FIG. 18C is determined.

At S1907, the control information transmission unit 904 of the communication management apparatus 403 notifies the hopping node C 401c of a changed connection destination (the hopping node A 401a) in wireless LAN communication.

At S1908, the hopping node C 401c connects to the hopping node A 401a, which is the designated connection destination, in mmWave wireless communication.

At S1909 and 1910, the hopping node A 401a transfers data to the hopping node C 401c, in addition to the hopping node B 401b.

Second Communication Path Changeover

Figure 20:
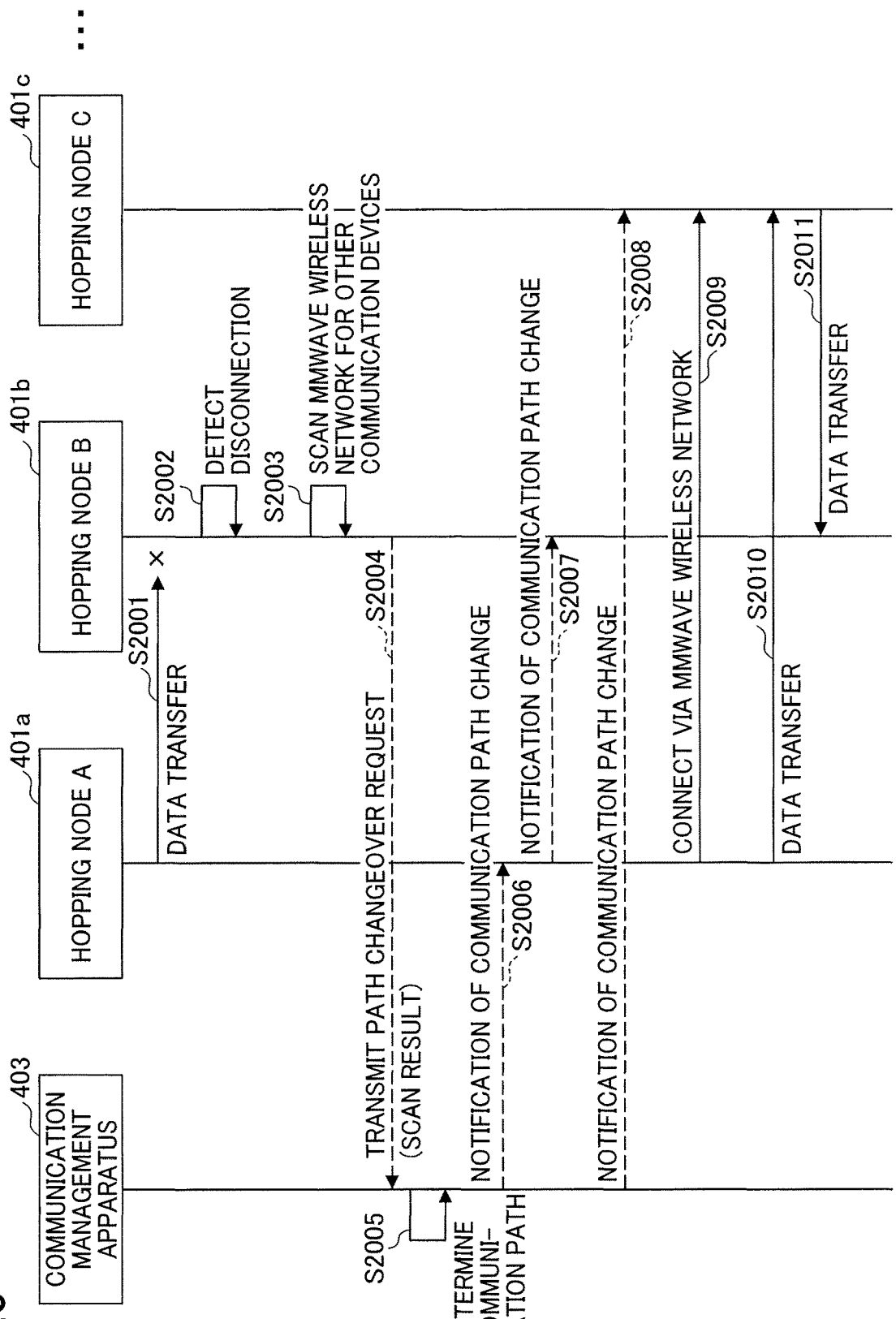
FIG. 20 is a sequence chart illustrating an example of communication path changeover according to Embodiment 1.

FIG. 20 is a sequence chart illustrating another example of communication path changeover according to Embodiment 1. The processing illustrated in FIG. 20 is started in the communication system 400 performing multi-hop communication using the communication path illustrated in FIG. 15.

For example, at S2001, the hopping node A 401a transfers data to the hopping node B 401b in mmWave wireless communication.

At S2002, the changeover determiner 714 of the hopping node B 401b detects disconnection of mmWave wireless communication with the hopping node A 401a. In this case, the changeover determiner 714 of the hopping node B 401b determines to change the mmWave wireless communication path and performs the processing starting at S2003.

At S2003, the changeover determiner 714 of the hopping node B 401b scans other communication devices in mmWave wireless communication, using the information collecting unit 712.

At S2004, the changeover determiner 714 of the hopping node B 401b transmits a path changeover request to the communication management apparatus 403 in wireless LAN communication. The path changeover request includes, for example, the scan result of mmWave wireless communication.

At S2005, the communication path determiner 903 of the communication management apparatus 403 uses the scan result received from the hopping node B 401b to update the mmWave wireless connection relations and the multi-hop communication path.

Here, as one example, the multi-hop communication path illustrated in FIG. 18D is determined. In this case, it is necessary for the control information transmission unit 904 of the communication management apparatus 403 to notify all hopping nodes 401 regarding which the data sender or the data recipient is changed, of the wireless LAN communication path changeover.

In S2006 to S2008, the control information transmission unit 904 of the communication management apparatus 403 notifies each hopping node 401 of the communication path changeover in wireless LAN communication.

At S2009, the hopping node A 401a connects to the hopping node C 401c, which is the designated data recipient, in mmWave wireless communication.

At S2010, the hopping node A 401a transfers the data to the hopping node C 401c, which is the designated data recipient, in mmWave wireless communication.

At S2011, the hopping node C 401c transfers the data to the hopping node B 401b, which is the designated data recipient, in mmWave wireless communication.

Thus, in the communication system 400 according to the present embodiment, the multi-hop communication path can be changed depending on the mmWave wireless communication link state, even during multi-hop communication.

In the above-described changeover of communication path, in a case of disconnection of mmWave wireless data transmission between the hopping nodes 401, the disconnected hopping node 401 performs scanning in mmWave wireless communication and then transmits a path changeover message to the communication management apparatus 403 in wireless LAN communication. The path changeover message indicates the occurrence of disconnection and includes the scan result.

The communication management apparatus 403 identifies new mmWave wireless connection relations (topology) based on the received scan result to determine a multi-hop communication path. Further, the communication management apparatus 403 notifies the disconnected hopping node 401 of the SSID of the mmWave wireless access point being a new connection destination, the encryption key, and the IP address of the hopping node 401 being a connection destination.

When the mmWave wireless communication quality parameters between the hopping nodes 401 (signal strength, throughput value, error rate, distance, etc.) become lower than thresholds during data transfer, preferably, the communication system 400 performs secondary determination of changeover for each application data or each requisite.

For example, in video streaming transfer, the communication system 400 executes the communication path changeover when the received sequence number is not updated for a period calculated based on threshold determination of packet loss rates of UDP and real-time transport protocol (RTP), frame rate, or both. In voice streaming transfer, the communication system 400 executes the communication path changeover when the received sequence number is not updated for a period calculated based on threshold determination of packet loss rates of UDP and real-time transport protocol (RTP), bit rate requirement, or both.

When the mmWave wireless communication path between the hopping nodes 401 is changed, preferably, the communication management apparatus 403 classifies the hopping nodes 401 into hopping nodes that has completed data reception and hopping node that have not completed data reception, with reference to the hopping node 401 sending the path changeover message. Further, the communication management apparatus 403 determines a mmWave wireless communication pair (an access point and a station) having a strong radio intensity, using one hopping node that has completed data reception and one hopping node that has not completed data. Then, the communication management apparatus 403 recalculates the path.

Embodiment 2

In Embodiment 1, the communication system 400 includes the dedicated communication management apparatus 403. Alternatively, the functions of the communication management apparatus 403 can be implemented by the hopping node 401. Description are given below of processing according to Embodiment 2 in which the hopping node 401 functions as the communication management apparatus 403.

Functional Configuration

Figure 21:
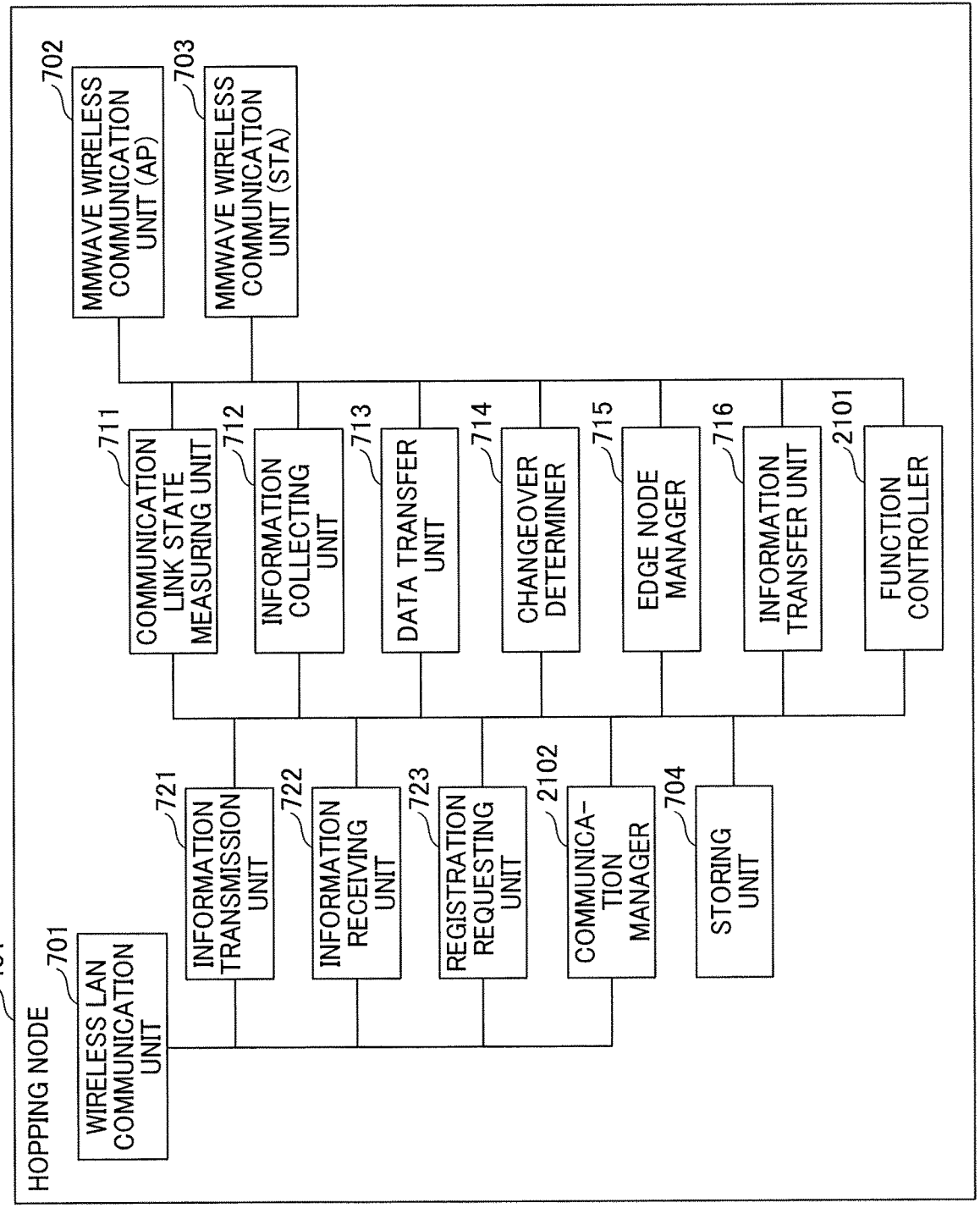
FIG. 21 is a functional block diagram of a hopping node according to Embodiment 2.

FIG. 21 is a functional block diagram of the hopping node 401 according to Embodiment 2. The hopping node 401 according to Embodiment 2 includes a function controller 2101 and a communication manager 2102 in addition to the functions of the hopping node 401, for example, illustrated in FIG. 7. Other than that, the configuration is similar to the functional configuration of the hopping node 401 illustrated in FIG. 7, and differences from the hopping node 401 illustrated in FIG. 7 are described.

The function controller 2101 is implemented, for example, by a program executed by the CPU 511 illustrated in FIG. 5A and causes the hopping node 401 to function as the communication management apparatus 403 according to a predetermined condition.

Figure 9:
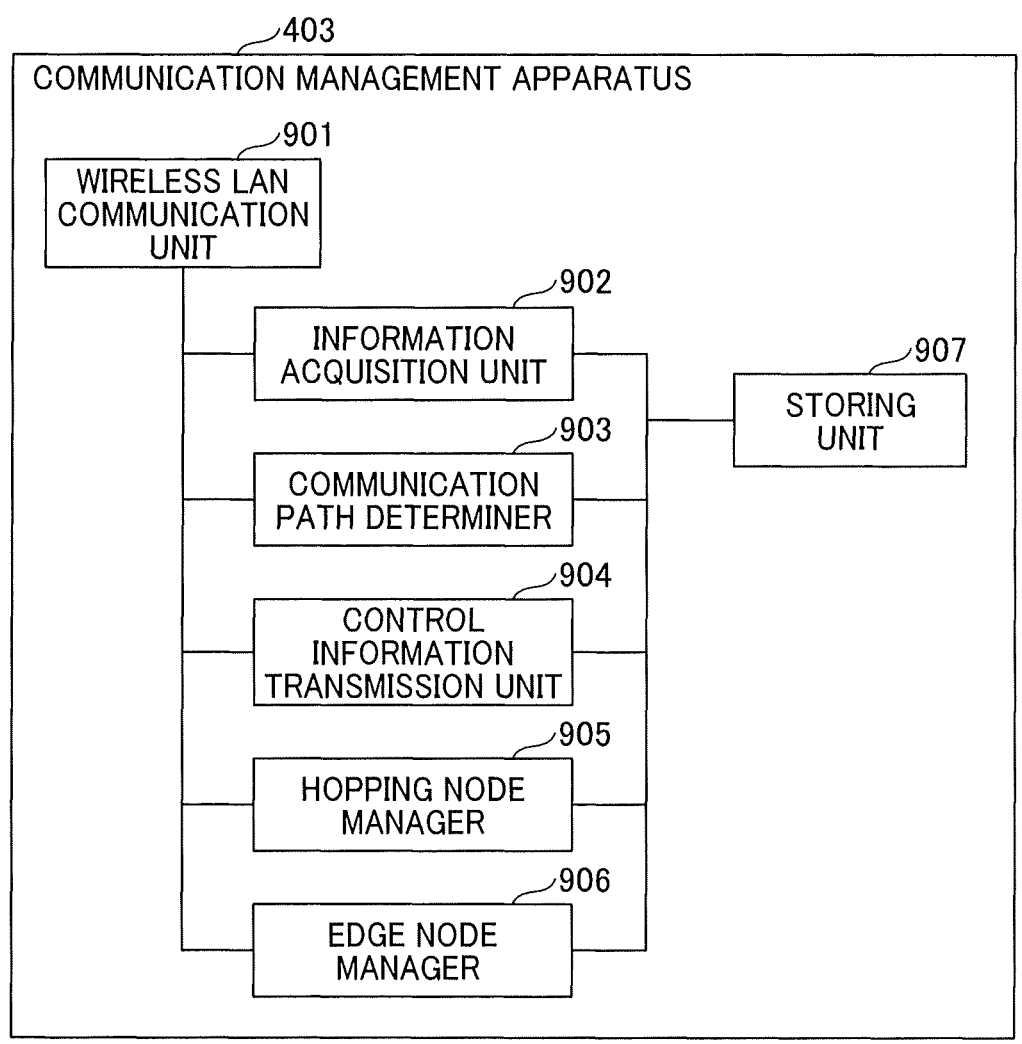
FIG. 9 is a functional block diagram of the communication management apparatus illustrated in FIG. 6.

The communication manager 2102 is implemented, for example, by a program executed by the CPU 511 illustrated in FIG. 5A and executes the function of the communication management apparatus 403 according to an instruction from the function controller 2101. For example, the communication manager 2102 executes functions of the information acquisition unit 902, the communication path determiner 903, the control information transmission unit 904, the hopping node manager 905, the edge node manager 906, and the like illustrated in FIG. 9.

Operation Flow

Operation Performed by Hopping Node

FIG. 22 is a flowchart illustrating example processing performed by the hopping node 401 according to Embodiment 2. The hopping node 401 executes the processing illustrated in FIG. 22, for example, at the start-up.

At S2201, the registration requesting unit 723 of the hopping node 401 searches, with the wireless LAN communication unit 701, the wireless LAN for the communication management apparatus 403.

At S2202, the registration requesting unit 723 determines whether the communication management apparatus 403 is present. Depending on the presence or absence thereof, the flow of processing bifurcates.

When the registration requesting unit 723 determines that the communication management apparatus 403 is not present (No at S2202), the operation of the registration requesting unit 723 proceeds to S2203. When the registration requesting unit 723 determines that the communication management apparatus 403 is present (Yes at S2202), the operation of the registration requesting unit 723 proceeds to S2207.

At S2203, the function controller 2101 of the hopping node 401 activates the communication manager 2102 to cause the hopping node 401 to function as a communication management apparatus.

At S2204, the hopping node 401 scans other communication devices in mmWave wireless communication. For example, the information collecting unit 712 of the hopping node 401 collects, with the mmWave wireless communication unit 703 (STA) and the communication link state measuring unit 711, information of other hopping nodes around the hopping node 401.

At S2205, the registration requesting unit 723 of the hopping node 401 requests the communication manager 2102 serving as the communication management apparatus, to register the hopping node 401 in the communication system 400.

At S2206, in response to the notification of registration completion from the communication manager 2102, the operation of the registration requesting unit 723 proceeds to S2210.

By contrast, at S2207 subsequent to S2202, the hopping node 401 scans other communication devices in mmWave wireless communication.

At S2208, the registration requesting unit 723 transmits, to the communication management apparatus 403, the request to register the hopping node 401 in the communication system 400, in wireless LAN communication.

At S2209, the registration requesting unit 723 determines whether the notification of registration completion from the communication management apparatus 403 is accepted in a period, which can be empirically predetermined and stored in a memory. Depending on the determination, the flow of processing bifurcates.

When the notification of registration completion from the communication management apparatus 403 is not accepted in the predetermined period (No at S2209), the operation of the registration requesting unit 723 returns to S2201. By contrast, when the notification of registration completion from the communication management apparatus 403 is accepted in the predetermined period (Yes at S2209), the operation of the registration requesting unit 723 proceeds to S2210.

From S2210 to S2213, in response to the scan request from the communication management apparatus 403 (or the communication manager 2102), the hopping node 401 scans other communication devices at regular time intervals and transmits a scan result to the sender of the request.

Processing of Communication Management Apparatus

FIG. 23 is a flowchart of example processing performed by the communication management apparatus 403 according to an embodiment. FIG. 23 illustrates a sequence of operation performed by the communication management apparatus 403 according to Embodiments 1 or 2. The communication management apparatus 403 repeatedly performs the communication management processing illustrated in FIG. 23.

The communication manager 2102 according Embodiment 2 can execute the communication management processing illustrated in FIG. 23.

At S2301, the hopping node manager 905 of the communication management apparatus 403 determines whether or not a request to register the hopping node 401 in the communication system 400 has been accepted.

When the registration request has been accepted (Yes at S2301), the operation of the hopping node manager 905 proceeds to S2302. When the registration request has not been accepted (No at S2301), the operation of the hopping node manager 905 proceeds to S2305.

At S2302, the hopping node manager 905 registers the hopping node 401 sending the registration request in the communication system 400.

At S2303, the hopping node manager 905 determines access point information (an SSID, an encryption key, a communication channel, an IP address, etc.) of the hopping node 401.

At S2304, the hopping node manager 905 transmits a notification of registration completion including the determined access point information, to the hopping node 401 being the request sender. Then, the operation proceeds to S2306.

At S2305 subsequent to S2301, the hopping node manager 905 determines whether there is any hopping node 401 registered in the communication system 400.

When the hopping node manager 905 determines that no hopping node 401 is registered (No at S2305), the hopping node manager 905 ends the operation. By contrast, when the hopping node manager 905 determines that there is the registered hopping node 401, the operation of the hopping node manager 905 proceeds to S2306.

At S2306, the communication management apparatus 403 waits for a predetermined time. The predetermined time is stored in a memory, for example, by a manufacturer based on empirical data. At S2307, the information acquisition unit 902 of the communication management apparatus 403 transmits a scan request to the registered hopping node 401.

At S2308, the information acquisition unit 902 accepts the scan result transmitted from the hopping node 401 to which the scan request has been sent.

At S2309, the hopping node manager 905 determines whether there is any hopping node 401 to which the scan request has been sent and from which a scan result is not received (i.e., whether there is any scan-requested hopping node 401 not transmitting scan result).

When the hopping node manager 905 determines that there is any scan-requested hopping node 401 from which a scan result is not received (Yes at S2309), the operation of the hopping node manager 905 proceeds to S2310. By contrast, when the hopping node manager 905 determines that there is no scan-requested hopping node 401 from which a scan result is not received, the operation of the hopping node manager 905 proceeds to S2311.

At S2310, the hopping node manager 905 deletes the hopping node 401 from which a scan result is not received, from the registration in the communication system 400.

At S2311, the communication path determiner 903 determines mmWave wireless connection relations using the scan result received at S2308.

Proxy Assignment

In the present embodiment, when registering the hopping node 401 in the communication system 400, the communication management apparatus 403 can assign the hopping node 401 as a proxy to function as the communication management apparatus 403 (hereinafter also "proxy-assigned hopping node 401").

FIG. 24 is a sequence chart illustrating an example of proxy assignment according to Embodiment 2. The operations from S2401 to S2407 and S2409 in FIG. 24 are similar to the hopping node registration according to Embodiment 1 illustrated in FIG. 19. Thus, differences from Embodiment 1 are described below.

At S2408, the hopping node manager 905 of the communication management apparatus 403 transmits, to the hopping node 401 that has transmitted the notification of registration completion, a notification of proxy assignment to assign functions of the communication management apparatus 403 thereto.

At S2410, the communication management apparatus 403 transmits a keepalive message to the proxy-assigned hopping node 401 at regular intervals. The communication management apparatus 403 further transmits, to the proxy-assigned hopping node 401, information of additional registration of the hopping node 401 and the edge node 402 and deletion thereof.

Preferably, when reception of keepalive message from the communication management apparatus 403 stops, the function controller 2101 of the proxy-assigned hopping node 401 enables the function of the communication manager 2102 to function as the communication management apparatus. At that time, preferably, the communication manager 2102 selects one of other hopping nodes 401 and transmits a notification of proxy assignment thereto. With this assignment, the function of the communication system 400 can be maintained even when the communication management apparatus 403 has a trouble.

In the above-described proxy assignment, in a case where the hopping node 401 does not detect the communication management apparatus 403 for a while at activation by power-on, the hopping node 401 itself serves as a communication management apparatus and enters standby for reception of new registration request from other hopping nodes 401.

Preferably, the communication management apparatus 403 transmits, to an initially registered hopping node 401, a massage authorizing a proxy to control the communication path, in wireless LAN communication.

Additionally, the hopping node 401 assigned as the communication management apparatus (i.e., the proxy-assigned hopping node 401) regularly exchanges the keepalive message with the communication management apparatus 403. When detecting an absence of the communication management apparatus 403, the proxy-assigned hopping node 401 starts functioning as the communication management apparatus.

As described above, according to one aspect of this disclosure, the communication system (400) includes a plurality of first (wireless) communication devices (e.g., the hopping node 401) each of which includes two mmWave wireless communication interfaces (first and second communication modules, e.g., the mmWave wireless communication unit 702 being an AP and the mmWave wireless communication unit 703 being a STA) and at least one wireless LAN communication interface (a third communication module, e.g., the wireless LAN communication unit 701). The first communication device supports multi-hop mmWave wireless communication.

The communication system (400) further includes a plurality of second (wireless) communication devices (e.g., the edge node 402) each of which includes one mmWave wireless communication interface (a fourth communication unit, e.g., the mmWave wireless communication unit 801 being a STA). The plurality of first communication devices and the plurality of second communication devices generate a wireless communication network.

The hopping node 401 uses one (the mmWave wireless communication device 516-1) of the two mmWave wireless communication interfaces as an access point and the other (the mmWave wireless communication devices 516-2) as a station.

All of the first and second (wireless) communication devices (e.g., the hopping nodes 401 and the edge nodes 402) belong to an identical wireless LAN sub network (e.g., the wireless LAN 407).

Further, according to one aspect, one of the first communication devices (the hopping nodes 401) serves as a communication management apparatus to calculate a mmWave wireless communication path between the hopping nodes 401 used for application data communication.

The communication management apparatus uses wireless LAN communication to collect information of the hopping nodes 401 used to calculate the path or transmit the calculated path to each hopping node 401.

Each hopping node 401 connects, in mmWave wireless communication, to the second communication device (the edge node 402) and generates a mmWave wireless network cell (a sub network). Thus, the hopping nodes 401 generate a layered network.

According to another aspect, upon activation by power-on, the hopping node 401 searches for the communication management apparatus 403 in wireless LAN communication.

When the hopping node 401 detects the communication management apparatus 403, the hopping node 401 performs scanning (searching peripheral communication devices), using the interface being the mmWave wireless communication station, and transmits, to the communication management apparatus 403, a scan result (a packet) including a registration request.

In response to reception of the packet, the communication management apparatus 403 registers that hopping node 401 as a terminal in the network under control thereof and transmits a notification of registration completion to that hopping node 401.

Further, when the communication system includes at least one terminal (e.g., the hopping node 401) registered therein, the communication management apparatus 403 regularly transmits a scan request to the registered hopping node 401. In response to reception of the scan request, the hopping node 401 performs scanning and transmits the scan result to the communication management apparatus 403.

When the communication management apparatus 403 receives a registration request from the hopping node 401 via the network in midway the above-mentioned processing, the hopping node 401 transmits the scan request also to the additionally registered hopping node 401 in next transmission of scan request.

Further, when the communication management apparatus 403 does not receive a response from the hopping node 401 for a predetermined period or the hopping node 401 exits the wireless LAN 407, the communication management apparatus 403 deletes the registration of the hopping node 401. With this operation, the communication system 400 can flexibly correspond to increases and decreases of the hopping nodes 401 in the network managed thereby.

Further, each time the communication management apparatus 403 receives the scan result from the registered terminal, the communication management apparatus 403 uses the scan result to calculate (determine) the mmWave wireless communication topology (connection relations).

In a state where the communication management apparatus 403 receives a notification of data transfer start from one of the edge node 402 (the second communication device) and determines that there is any hopping node 401 (the first communication device) incapable of millimeter wave wireless communication, preferably, the communication management apparatus 403 assigns the wireless LAN IP address of that hopping node 401 to the sender IP address of a particular hopping node 401.

In the case of streaming transfer, the communication management apparatus 403 instructs the wireless LAN communication interface (the wireless LAN communication unit 701) of the hopping node 401 incapable of mmWave wireless communication, to set a multicast address and a port number to be used.

Preferably, the communication management apparatus 403 transmits, using wireless LAN communication, to any one of the hopping node 401, a topology adjustment message, which includes the IP address of the edge node 402 to be disconnected and the SSID, the encryption key, and the IP address of the mmWave wireless access point being a new connection destination.

In response to receipt of the message, the hopping node 401 transmits, using mmWave wireless communication, to the edge node 402, a message including disconnection order and the SSID, the encryption key, and the IP address of the access point being the new connection destination.

In response to receipt of this message, the edge node 402 switches from the mmWave wireless access point currently connected to the newly designated access point.

When the signal strength or throughput value of the connection with the mmWave wireless access point of the hopping node 401 is equal to or lower than the threshold, or the packet loss rate is equal to or greater than the threshold, the edge node 402 disconnects from the access point and performs scanning. Then, the edge node 402 connects to the mmWave wireless access point of the hopping node 401 (new connection destination) with which the signal strength is strongest.

The hopping node 401 being the new connection destination (to which the edge node 402 is added) transmits, to the communication management apparatus 403, a new terminal addition message including terminal information of the added edge node 402.

The communication management apparatus 403 receiving this message can grasp, from the terminal information of the added edge node 402, reduction of number of the edge nodes 402 connected to the hopping node 401 and the information of the added hopping node 401.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A communication system for performing multi-hop data communication using a plurality of communication devices, the communication system comprising:
   a plurality of first communication devices, each of which includes first circuitry configured to:
      perform first wireless communication using a directive radio wave, using a first function module and a second function module;
      perform second wireless communication, wider in communication range than the first wireless communication, using a third function module; and
      form network cells different from each other, using the first function module of each of the plurality of first communication devices;
   a second communication device including second circuitry configured to:
      perform the first wireless communication with the first function module; and
      connect to one of the network cells; and
   a third communication device including third circuitry configured to:
      perform the second wireless communication; and
      manage a multi-hop communication path using the second wireless communication, wherein
   the first circuitry of each first communication device of the plurality of first communication devices is further configured to:
      collect information of peripheral communication devices in the first wireless communication;
      transmit the information of the peripheral communication devices to the third communication device in the second wireless communication; and
      transfer, in the first wireless communication, data received in the first wireless communication to a first communication device or to the second communication device, according to an instruction on the multi-hop communication path transmitted in the second wireless communication from the third communication device.

2. The communication system according to claim 1, wherein the first circuitry of each of the plurality of first communication devices is configured to transfer the data, received by one of the first function module and the second function module, to the first communication device or the second communication device, using the other of the first function module and the second function module.

3. The communication system according to claim 1, wherein the third circuitry of the third communication device is configured to:
   acquire the information of the peripheral communication devices from the plurality of first communication devices in the second wireless communication;
   determine the multi-hop communication path based on the information of the peripheral communication devices; and
   transmit the instruction on the multi-hop communication path to the plurality of first communication devices located on the multi-hop communication path in the second wireless communication, the instruction including information of a data recipient.

4. The communication system according to claim 3, wherein the third circuitry of the third communication device is configured to:
   determine connection relations among the plurality of first communication devices and the second communication device in the first wireless communication, using the information of peripheral communication devices; and
determine the multi-hop communication path based on the determined connection relations.

5. The communication system according to claim 3, wherein
the second circuitry of the second communication device is configured to transmit, in either the second wireless communication or the first wireless communication via at least one of the plurality of first communication devices, request information for transmission of the data, to the third communication device, and
the third circuitry of the third communication device is configured to:
determine the multi-hop communication path through which the data is transmitted, according to request information; and
transmit the instruction on the multi-hop communication path, in the second wireless communication, to the first communication device located on the multi-hop communication path.

6. The communication system according to claim 1, wherein
the first function module functions as an access point to generate the network cell in the first wireless communication, and
the second function module functions as a station to connect, in the first wireless communication, to the network cell generated by another one of the plurality of first communication devices.

7. The communication system according to claim 1, wherein
the first circuitry of each of the plurality of first communication devices is configured to transmit a registration request in the communication system upon activation, to the third communication device in the second wireless communication, the registration request including the information of peripheral communication devices, and
the third circuitry of the third communication device is configured, in response to acceptance of the registration request transmitted in the second wireless communication from the first communication device, to:
register the first communication device in the communication system; and
transmit a notification of registration completion including identification information for identifying the network cell, in the second wireless communication, to the first communication device.

8. The communication system according to claim 7, wherein the third circuitry of the third communication device is configured to nullify registration of the first communication device in the communication system in response to a determination that a period of reception of the information of peripheral communication devices from the first communication device registered in the communication system has exceeded a threshold.

9. The communication system according to claim 7, wherein the first circuitry of each of the plurality of first communication devices is configured to use the identification information of the network cell, included in the notification of registration completion from the third communication device, to generate the network cell.

10. A communication device used in a communication system to perform multi-hop data communication using a plurality of communication devices, the communication device comprising:
circuitry configured to:
perform first wireless communication using a directive radio wave, using a first function module and a second function module;
perform second wireless communication, wider in communication range than the first wireless communication, using a third function module;
form a network cell using the first function module;
collect, in the first wireless communication, information of peripheral communication devices;
transmit the information of the peripheral communication devices to a communication management apparatus in the second wireless communication, the communication management apparatus configured to manage a multi-hop communication path using the second wireless communication; and
transfer, in the first wireless communication, data received in the first wireless communication to a first communication device of the plurality of communication devices, according to an instruction on a multi-hop communication path transmitted in the second wireless communication from the communication management apparatus.

11. A communication management method performed by a communication system for performing multi-hop data communication using a plurality of communication devices, the communication management method comprising:
performing, by each one of a plurality of first communication devices, first wireless communication using a directive radio wave;
performing second wireless communication that is wider in communication range than the first wireless communication;
generating a network cell;
collecting, in the first wireless communication, information of peripheral communication devices;
transmitting the information of the peripheral communication devices to a communication management apparatus in the second wireless communication, the communication management apparatus configured to manage a multi-hop communication path using the second wireless communication; and
transferring, in the first wireless communication, data received in the first wireless communication to a first communication device or to a second communication device, according to an instruction on a multi-hop communication path transmitted in the second wireless communication from the communication management apparatus.

* * * * *